(12) United States Patent
Seki et al.

(10) Patent No.: US 8,180,989 B2
(45) Date of Patent: May 15, 2012

(54) STORAGE CONTROLLER AND STORAGE CONTROL METHOD

(75) Inventors: Toshiya Seki, Odawara (JP); Eiju Katsuragi, Odawara (JP); Takashi Sakaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/025,451

(22) Filed: Feb. 11, 2011

(65) Prior Publication Data

US 2011/0138143 A1  Jun. 9, 2011

Related U.S. Application Data

(63) Continuation of application No. 12/700,975, filed on Feb. 5, 2010, which is a continuation of application No. 11/702,122, filed on Feb. 5, 2007, now Pat. No. 7,681,002.

(30) Foreign Application Priority Data

Dec. 13, 2006 (JP) .................. 2006-335903

(51) Int. Cl.
*G06F 7/00* (2006.01)
*G06F 12/00* (2006.01)

(52) U.S. Cl. ... 711/165; 707/667; 707/705; 707/E17.01; 711/154; 711/162; 711/E12.001; 714/E11.118; 714/E11.12; 714/E11.121

(58) Field of Classification Search .............. None
See application file for complete search history.

(56) References Cited

U.S. PATENT DOCUMENTS

| 3,725,870 | A | 4/1973 | Felcheck et al. |
| 4,467,421 | A | 8/1984 | White |
| 4,583,194 | A | 4/1986 | Cage |
| 5,455,944 | A | 10/1995 | Haderle et al. |
| 5,809,551 | A | 9/1998 | Blandy |
| RE36,989 | E | 12/2000 | White |
| 6,385,706 | B1 | 5/2002 | Ofek et al. |
| 6,718,538 | B1 | 4/2004 | Mathiske |
| 6,745,305 | B2 | 6/2004 | McDowell |

(Continued)

FOREIGN PATENT DOCUMENTS

JP  2004-127301  4/2004

(Continued)

OTHER PUBLICATIONS

European Patent Office extended European search report on Application No. 07254024.8 dated Aug. 3, 2010; 3 pages.

*Primary Examiner* — Reginald Bragdon
*Assistant Examiner* — Daniel Bernard
(74) *Attorney, Agent, or Firm* — Mattingly & Malur, PC

(57) ABSTRACT

A storage controller having a plurality of storage devices and a control circuit providing a plurality of virtual volumes, to each of which a storage area in a plurality of pool volumes provided with the plurality of storage devices can be mapped for writing data in response to a write access sent from an information processing apparatus to a logical area in one of the plurality of virtual volumes, respectively. The control circuit, according to a search of the plurality of pool volumes for a certain storage area in which a certain data pattern is written, releases the certain storage area from mapping to a logical area in the plurality of virtual volumes, so that the control circuit can use the released certain storage area for mapping to a virtual volume of the plurality of virtual volumes as a destination of another write access from the information processing apparatus.

22 Claims, 21 Drawing Sheets

U.S. PATENT DOCUMENTS

| | | |
|---|---|---|
| 6,823,442 B1 | 11/2004 | Cameron |
| 6,925,530 B2 | 8/2005 | Busser et al. |
| 7,093,068 B2 | 8/2006 | Yamagami |
| 7,225,314 B1 | 5/2007 | Bonwick et al. |
| 7,529,921 B2 | 5/2009 | Stein et al. |
| 7,581,061 B2 | 8/2009 | Miyagaki et al. |
| 2002/0004890 A1 | 1/2002 | Ofek et al. |
| 2003/0065898 A1 | 4/2003 | Flamma et al. |
| 2004/0030822 A1 | 2/2004 | Rajan et al. |
| 2004/0068636 A1 | 4/2004 | Jacobson et al. |
| 2004/0139125 A1 | 7/2004 | Strassburg et al. |
| 2004/0230766 A1 | 11/2004 | Cameron |
| 2004/0260861 A1 | 12/2004 | Serizawa et al. |
| 2004/0267832 A1 | 12/2004 | Wong et al. |
| 2005/0091266 A1 | 4/2005 | Hasegawa |
| 2005/0182890 A1 | 8/2005 | Yamagami |
| 2006/0075187 A1 | 4/2006 | Nakashima et al. |
| 2006/0085471 A1 | 4/2006 | Rajan et al. |
| 2006/0133362 A1 | 6/2006 | Stein et al. |
| 2007/0233990 A1 | 10/2007 | Kucznyski et al. |
| 2008/0109616 A1 | 5/2008 | Taylor |

FOREIGN PATENT DOCUMENTS

| | | |
|---|---|---|
| JP | 2005-011316 | 1/2005 |
| JP | 2005-128771 | 5/2005 |
| JP | 2005-234820 | 9/2005 |
| WO | WO 99/32995 | 7/1999 |

FIG.7

CACHE MANAGEMENT TABLE

| SLOT#2 | CACHE MANAGEMENT INFORMATION |
|---|---|
| 1 | .... |
| 2 | .... |
| 5 | .... |
| 8 | .... |
| .. | .... |

FIG.13

CACHE MANAGEMENT TABLE

| SLOT#1 | CACHE MANAGEMENT INFORMATION |
|---|---|
| 0 | .... |
| 1 | .... |
| 3 | .... |
| 6 | .... |
| .. | .... |

FIG.20

LM MAPPING TABLE

| SLOT#1 | SLOT#2 |
|--------|--------|
| 1 | 146 |
| 4 | 3 |
| 6 | 9 |
| 12 | 64 |
| .... | .... | ly
STORAGE CONTROLLER AND STORAGE CONTROL METHOD

CROSS-REFERENCES TO RELATED APPLICATIONS

This application is a continuation of application Ser. No. 12/700,975, filed Feb. 5, 2010, which is a continuation of application Ser. No. 11/702,122, filed Feb. 5, 2007 (now U.S. Pat. No. 7,681,002), the entire disclosures of which are incorporated herein by reference.

This application relates to and claims priority from Japanese Patent Application No. 2006-335903, filed on Dec. 13, 2006, the entire disclosure of which is incorporated herein by reference.

BACKGROUND

1. Field of the Invention

This invention relates to a storage control technique for controlling the transmission of data between host systems and a storage apparatus including hard disks.

2. Description of Related Art

Storage controllers with the above technique control the migration of data between host systems and storage apparatuses based on data write/read requests sent from the host systems to the storage apparatuses. They also provide the storage areas in the storage apparatuses, as logical areas, to the host systems. The host systems access logical volumes and write/read data to/from the logical areas in the logical volumes. The storage controllers are also called storage subsystems and they constitute, with the host systems, storage systems. Each storage apparatus includes a plurality of storage devices, e.g., hard disk drives.

With the increase in the amount of data handled in host systems, the volume size—storage capacity of logical volumes—has to be proportionate to that amount. If large-size logical volumes are allocated to host systems in the first place, there will be no shortage of storage capacity for the host systems. However, if the host systems do not handle a large amount of data, there will be unused areas in the storage areas allocated to the host systems, which means that the storage resources are wasted.

JP2005-11316 A discloses a storage area allocated to a volume for the first time when a processor in a host computer write-accesses the volume. U.S. Pat. No. 6,823,442 describes volumes host systems access provided in a storage system and physical storage areas allocated to these volumes.

Incidentally, as a relevant conventional example, JP2005-128771 A describes a data file system having: a data access server that has a data-storing physical storage device accessed in response to an access request; and a data file server that sends an access request to the data access server and performs data filing using the data access server to store data. In this data file system, when a logical block is no longer used, its physical block is released.

JP2004-127301 A describes a storage system having: virtual storage spaces; physical storage spaces; a mapping system that associates the addresses of the virtual storage spaces with the addresses of the physical storage spaces; and a controller that automatically deletes a portion in the mapping system in accordance with the priority rule for designating deletion target portions in the mapping system. JP2005-234820 also describes a technique related to this invention.

The inventors of this invention have developed a technique called Allocation-on-Use (AOU) for the effective use of storage resources in a storage system. A storage controller provides virtual volumes—volumes without actual storage areas—to host systems and establishes correspondences between the virtual volumes and the logical volumes called pools—volumes to which real storage areas in the storage apparatus are allocated. When a host systems write-accesses an area in a virtual volume, the storage controller allocates a storage area in a pool volume to the host-accessed area in the virtual volume. Allocation is performed each time any of the host systems writes new data in any of the virtual volumes. The host systems only see the virtual volumes with a seemingly large storage capacity. Because the storage controller does not allocate large-capacity storage areas to the host systems from the beginning, but allocates a storage area on each occasion, the host systems can use the storage resources in the storage apparatus effectively.

When a host system deletes data, if it deletes not the data itself but only the management information for the data, the storage controller cannot recognize the storage areas storing unnecessary data and these storage areas remain in the storage apparatus, running the risk that they accumulate in the storage apparatus, which prevents the host systems from using the storage resources in the storage apparatus effectively.

This invention aims to provide a storage control technique by which, although actual data is not deleted but the management information for that data is deleted, a host system can recognize the storage areas storing unnecessary data, and accordingly use them effectively.

Another object of this invention is to provide a storage control technique by which the storage areas storing unnecessary data are released from allocation to the host systems so that they can be used by the host systems effectively. Still another object of this invention is to provide a storage controller and storage control method that enable the effective use of the storage resources in the foregoing AOU storage systems.

SUMMARY

In order to achieve the above objects, this invention provides a storage controller and storage control method capable of detecting a storage area storing unnecessary data not accessed by a host system and releasing that storage area from allocation to the host system.

To that end, this invention provides a storage controller having a control circuit for controlling the migration of data between a host system and a storage apparatus, the migration being performed in response to a data write request or data read request sent from the host system to the storage apparatus. In this storage controller, the control circuit includes: a first volume accessible by the host system, having no real storage area in the storage apparatus allocated thereto; a second volume having a real storage area allocated thereto; and a control table defining the correspondence relationships between logical areas in the first volume the host system accesses and the real storage areas in the second volume. When the host system makes a request to write data in a logical area in the first volume, the control circuit allocates a real storage area to the second volume and registers the correspondence relationship between the logical area in the first volume and the real storage area in the second volume in the control table. When the host system makes a request to read data from the logical area in the first volume, the control circuit reads, by referring to the control table, data from the real storage area in the second volume corresponding to the read-requested logical area and provides it to the host system. In response to a host system's request to delete the data, the control circuit releases the real storage area in the second volume from its correspondence relationship with the logical area that is the data storage destination.

This invention also provides a storage control method for a storage controller having a control circuit for controlling the migration of data between a host system and a storage apparatus, the migration being performed in response to a data write request or data read request sent from the host system to the storage apparatus. In this method, the control circuit detects a storage area storing unnecessary data that is not accessed by the host system and releases that storage area from allocation to the host system.

With the storage controller according to this invention, even if not data, but only its management information is deleted, the host system can recognize the storage areas storing unnecessary data and release them from allocation to the host system so that it can use them effectively.

BRIEF DESCRIPTION OF THE DRAWINGS

FIG. 7 is a cache control table where the correspondence relationships are established between the slots in pool volumes and memory areas in the cache memory.

FIG. 13 is a control table where the correspondence relationships are established between the slots in the virtual volumes and the memory areas in the cache memory.

FIG. 20 is a mapping table stored in the local memory in the channel control unit, storing the correspondence relationships between virtual volume areas and pool volume areas.

DETAILED DESCRIPTION OF PREFERRED EMBODIMENTS

Figure 1:
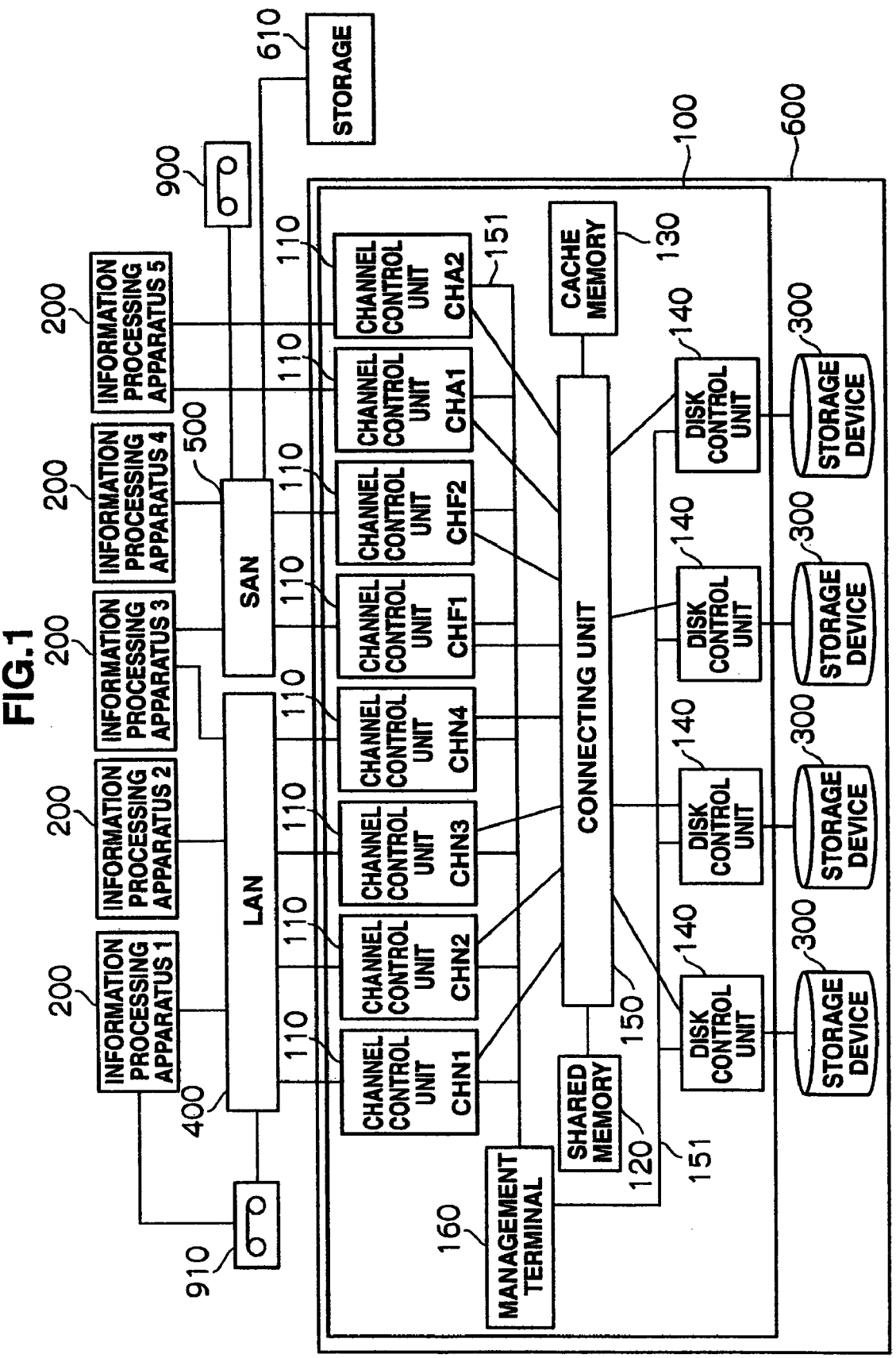
FIG. 1 is a block diagram of a storage system including a storage controller according to this invention.

Embodiments of this invention are explained below. FIG. 1 is a hardware block diagram showing a first embodiment of a storage system having a storage controller according to this invention.

In FIG. 1, the storage system is composed of the storage controller 600 according to this invention and information processing apparatuses—host systems (hosts). Although FIG. 1 is explained for the case where the storage controller 600 includes storage devices 300, the storage devices 300 may also be separate from the storage controller 600.

The storage controller 600 is composed of a plurality of storage devices 300 and a control circuit 100 that controls the input/output of data to/from the storage devices 300 in response to input/output requests from the information processing apparatuses 200.

The information processing apparatuses 200—host systems—are servers (hosts) having CPUs and memories, or computers for managing the storage apparatus, such as work stations, mainframe computers, or personal computers. An information processing apparatus 200 may be created by connecting a plurality of computers to one another via a network. Each information processing apparatus 200 includes application program(s) run on an operation system. Examples of the application programs include automated telling systems for banks and air seat reservation systems. Examples of servers include update-type servers and backup servers that make backups at the back ends of the update-type servers.

The information processing apparatuses 1-3 (200) are connected to the storage controller 600 via a LAN (Local Area Network) 400. The LAN 400 is a communication network such as Ethernet (registered trademark) or FDDI and the communication between the information processing apparatuses 1-3 (200) and storage controller 600 is performed based on TCP/IP protocol. The information processing apparatuses 1-3 (200) send file-name-designated data access requests (requests for the input/output of data in units of files, hereinafter called 'file access requests') to channel control units CHN1-CHN4 (110) in the storage controller 600, which will be described later.

A backup device 910 is connected to the LAN 400. Examples of the backup device 910 include a disk-type device such as an MO, CD-R, DEV-RAM, or DVD-RAM, or a tape-type device such as a DAT tape, cassette tape, open tape or cartridge tape. The backup device 910 communicates with the control circuit 100 via the LAN 400 and stores a backup of data stored in the storage devices 300. The backup device 910 is also connected to the information processing apparatus 1 (200) so it may also store a backup of data stored in the storage devices 300 via the information processing apparatus 1 (200).

The control circuit 100 includes channel control units CHN1 to CHN4 (110). The control circuit 100 mediates write/read access between the information processing apparatuses 1-3 (200), the backup device 910, and the storage devices 300 via the channel control units CHN1 to CHN4 (110) and LAN 400. The channel control units CHN1 to CHN4 (110) receive file access requests from the information processing apparatuses 1-3 (200), respectively. In other words, the channel control units CHN1 to CHN4 (110) are assigned network addresses on the LAN 400 (e.g., IP addresses) respectively. Each of the channel control units serves as a NAS and is capable of providing services to the information processing apparatuses 1-3 (200) as if it were an independent NAS. NAS servers are conventionally operated in separate computers but, in this invention, they are collected in a single storage controller, i.e., the channel control units CHN1 to CHN4 (110) each providing services as a NAS are arranged in a single storage controller. Accordingly, the integrated management of the storage controller 600 becomes possible, thereby enabling efficient maintenance services such as various settings, controls, failure management, and version management.

The information processing apparatuses 3 and 4 (200) are connected to the control circuit 100 via a SAN 500. The SAN 500 is a network for the transmission of data between the information processing apparatuses 3 and 4 (200) and the storage controller 600 in units of blocks, which are the data management units in the storage areas provided by the storage devices 300. Communication between the information processing apparatuses 3 and 4 (200) and the control circuit 100 via the SAN 500 is performed usually based on SCSI protocol. The information processing apparatuses 3 and 4 (200) send requests for data access in units of blocks ('block access requests') to the storage controller 600 based on Fibre Channel Protocol.

A SAN-compatible backup device 900 is connected to the SAN 500. The SAN-compatible backup device 900 communicates with the control circuit 100 via the SAN 500 and stores a backup of data stored in the storage devices 300.

The control circuit 100 includes, in addition to the channel control units CHN1 to CHN4 (110), channel control units CHF1 and CHF2 and CHA1 and CHA2 (110). The control circuit 100 communicates with the information processing apparatuses 3 and 4 (200) and SAN-compatible backup device 900 via the channel control units CHF1 and CHF2 (110) and the SAN 500. The channel control units each process access commands from the host systems.

An information processing apparatus 5 (200) is connected to the control circuit 100 without the use of any network such as a LAN 400 or SAN 500. Examples of the information processing apparatus 5 (200) include a mainframe computer. The communication between the information processing apparatus 5 (200) and the control circuit 100 is performed based on communication protocols such as FICON (Fiber Connection; registered trademark), ESCON (Enterprise System Connection; registered trademark), ACONARC (Advanced Connection Architecture; registered trademark), and FIBARC (Fiber Connection Architecture; registered trademark). The information processing apparatus 5 (200) sends block access requests to the storage controller 600 based on these communication protocols. The control circuit 100 communicates with the information processing apparatus 5 (200) via its channel control unit CHA1 or CHA2 (110).

Another storage apparatus 610 is connected to the SAN 500. The storage apparatus 610 provides its own storage resources to the control circuit 100. This means that the storage apparatus 610 expands the outward storage areas for the information processing apparatuses. Incidentally, the storage apparatus 610 may be connected to the storage controller 600 via a communication line such as an ATM, besides the SAN 500. It may also be directly connected to the storage controller 600.

With the storage controller 600 including channel control units CHN1 to CHN4 (110), channel control units CHF1 and CHF2 (110), channel control units CHA1 and CHA2 (110), the storage system can be connected to different types of networks. That is, a SAN-NAS integrated storage system connected to the LAN 400 via the channel control units CHN1 to CHN4 (110) and to the SAN 500 via channel control unit CHF1 and CHF2 (110) can be realized.

A connecting unit 150 connects the respective channel control units 110, shared memory 120, cache memory 130, and respective disk control units 140 to one another. Transmission of commands and data between them is performed via the connecting unit 150. The connecting unit 150 is, for example, a high-speed bus such as a super-fast crossbar switch that transmits data by high-speed switching. This connecting unit 150 enhances the performance of communication between the channel control units 110 to a great extent and also enables high-speed file sharing and high-speed failover.

The shared memory 120 and cache memory 130 are memory apparatuses shared among the channel control units 110 and disk control units 140. The shared memory 120 is used for mainly storing control information and commands and the cache memory 130 is used for mainly storing data. For example, when one of the channel control units 110 receives a write command—one kind of data input/output command—from an information processing apparatus 200, it writes the write command in the shared memory 120 and writes the write data it receives from the information processing apparatus 200 in the cache memory 130.

The disk control units 140 monitor the shared memory 120 and when they detect that a write command has been written in the shared memory 120, the relevant disk control unit 140 reads the write data from the cache memory and writes it in the storage devices 300 in response to the write command.

Meanwhile, if a channel control unit 110 receives a read command—a kind of input/output command—from an information processing apparatus 200, it writes the read command in the shared memory 120 and checks wither or not the read target data exists in the cache memory 130. If the read target data exists in the cache memory 130, the channel control unit 110 reads it and sends it to the information processing apparatus 200. If the read target data does not exist in the cache memory 130, the disk control unit 140 that has detected that the read command has been written in the shared memory 120 reads the read target data from the storage devices 300, writes it in the cache memory 130, and writes a notice to that effect in the shared memory 120. The channel control units 110 monitor the shared memory 120 and when they detect that the read target data has been written in the cache memory 130, the relevant channel control unit 100 reads it from the cache memory 130 and sends it to the information processing apparatus 200.

The disk control units 140 convert logical address-designated data access requests sent from the channel control units 110 to the storage devices 300 to physical address-designated data access requests; and write/read data to/from the storage devices 300 in response to the I/O requests from the channel control units 110. When the storage devices 300 are RAID-structured, the disk control units 140 access data in a manner compatible with the RAID structure. In other words, the disk control units 140 control the storage devices 300—HDDs—and RAID groups. The RAID groups are composed of the storage areas in the HDDs.

Each storage device 300 includes one or a plurality of disk drives (a physical volume) and provides storage areas accessible by the information processing apparatuses 200. Logical volumes are set for the storage areas provided by one or more physical volumes in the storage devices 300. Examples of the logical volumes set for the storage devices 300 includes user logical volumes accessible by the information processing apparatuses 200 and system logical volumes used for controlling the channel control units 110. The system logical volumes store operating systems run by the channel control units 110. The storage devices 300 provide the logical volumes accessible by the respective channel control units 110 to the host systems. Incidentally, two or more channel control units 110 can share a single logical volume.

Incidentally, the storage devices 300 may be hard disk devices. The storage devices 300 may form RAID-type disk arrays as a storage configuration. The storage devices 300 and control circuit 100 may be connected directly or indirectly via a network. The storage devices 300 may also be integrated with the control circuit 100. The storage devices 300 may alternatively be semiconductor memories such as flash memories.

The management terminal 160 is a computer for the maintenance and management of the storage controller 600, and is connected to the respective channel control units 110 and disk control units 140 via an internal LAN 151. The operator of the management terminal 160 can make settings for the disk drives in the storage devices 300 and for the logical volumes, and can also install micro programs to be run by the channel control units 110 and disk control units 140. This kind of setting and installation work may be carried out either by the management terminal 160 or the programs on the host systems, in the latter case, the work is carried out via a network.

Figure 2:
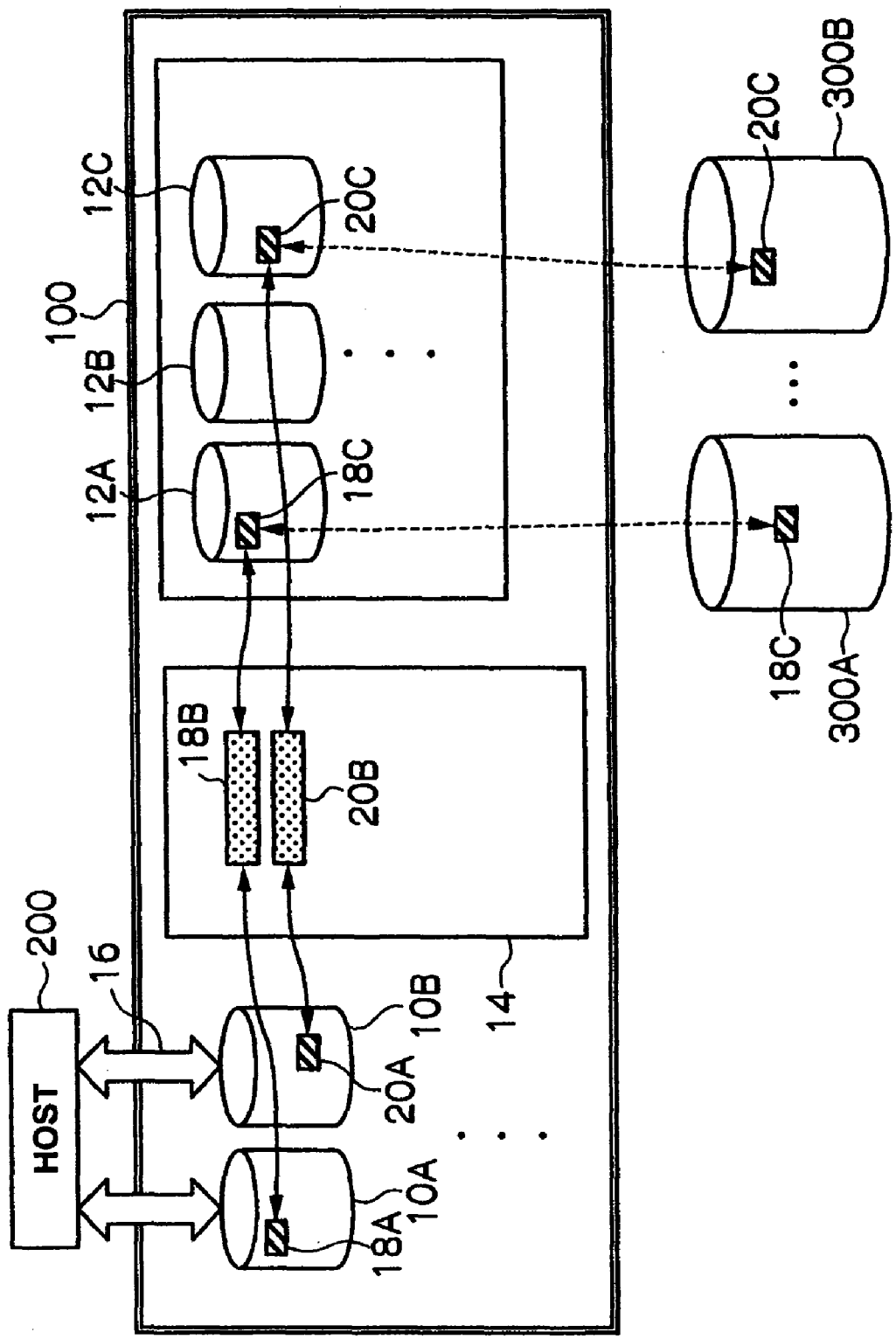
FIG. 2 is a schematic block diagram of the storage system in FIG. 1, explaining AOU.

FIG. 2 is a block diagram explaining the functions of the storage system using AOU, which was explained before. The control circuit 100 provides virtual volumes 10 (10A, 10B) to the host 200. These virtual volumes 10 are logical volumes that do not have actual storage areas. The host 200 accesses the logical areas in the virtual volumes 10. The virtual volumes 10—virtual volumes 10A and 10B—are allocated to the host 200. The host 200 accesses a logical area 18A in the virtual volume 10A and a logical area 20A in the virtual volume 10B. The reference numeral 16 indicates read/write access from the host 200 to the virtual volumes 10 (10A, 10B).

The control circuit 100 also provides pool volumes 12 (12A, 12B, 12C) to the host 200. The real storage areas in the storage devices 300 (300A, 300B) are allocated to these pool volumes. The reference numeral 18C indicates a real storage area (PDEV: physical volume) in the storage device 300A. This real storage area is allocated to the pool volume 12A. Also, a real storage area 20C in the storage device 300B is allocated to the pool volume 12C.

The reference numeral 14 indicates a mapping table showing the correspondence relationships between the logical areas in the virtual volumes and the storage areas in the pool volumes. The reference numeral 18B indicates the control information for the correspondence relationship between the logical area 18A in the virtual volume 10A and the real storage area 18C in the pool volume 12A. The reference numeral 20B indicates the control information for the correspondence relationship between the logical area 20A in the virtual volume 10B and the real storage area 20C in the pool volume 12C. In short, the mapping table 14 stores control information. The information regarding the virtual volumes 18, pool volumes 12, and mapping table 14 is stored in the shared memory 120.

Control information (18B, 20B) is the information for the correspondence relationship between the logical addresses of areas in a specific virtual volume and the logical addresses of real storage areas in a specific pool volume. In the foregoing AOU system, when the host 200 write-accesses a logical area in a virtual volume, which has not yet been mapped onto a real storage area, the control circuit 100, being triggered by the access, maps a real storage area in a pool volume to that logical area in the virtual volume. When the host 200 issues a read command to the control circuit 100, the control circuit 100 reads target data from the area in the pool volume corresponding to the host-accessed logical area in the virtual volume and sends it to the host 200. The control circuit 100 only shows the capacities of the virtual volumes to the host 200.

Mapping of real storage area(s) in a pool volume onto logical area(s) in a virtual volume is performed using a suitably-selected unit. One example is called a 'page,' and has 512 M bytes. In the mapping table 14, logical areas in units of pages in the virtual volumes are mapped onto the real storage areas in the same units in the pool volumes. Incidentally, the minimum logical area and storage area unit is called a 'slot,' which is, for example, about 256 bytes. A page is a collection of slots. Mapping may be performed in units of slots. Incidentally, in this embodiment, mapping is performed in units of pages because, if mapping is performed in units of slots, the mapping table becomes complicated.

Figure 3:
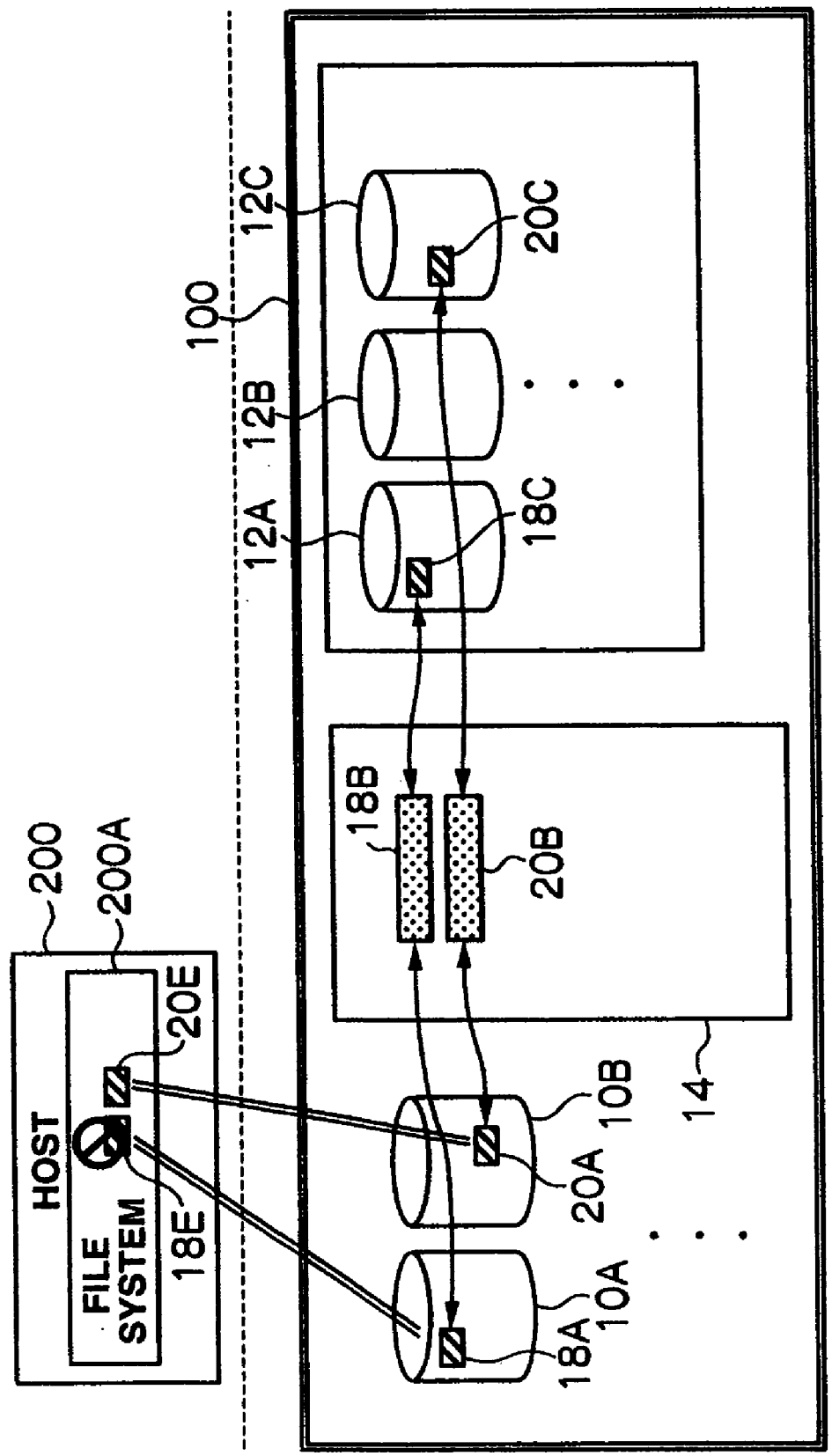
FIG. 3 is a block diagram of the storage system in FIG. 1, explaining the problems in AOU.

As shown in FIG. 3, the host 200 has a file system 200A. The reference numeral 18E indicates the management information for the data in the logical area 18A in the virtual volume 10A, and the reference numeral 20E indicates the management information for the data in the logical area 20A in the virtual volume 20A. The file system 200A stores this management information in the local memory in the host 200. FIG. 3 shows that, when deleting the data in the logical area 18A in the virtual volume 10A, the file system 200A in the host 200 deletes only the management information for that data, not the data itself. The control information 18B shows that the data in the logical area 18A in the virtual volume 10A actually exists in the corresponding real storage area 18C in the pool volume 12A.

Once the management information 18E is deleted, the host 200 can no longer access the logical area 18A. However, as long as the virtual volume 10A is not deleted, the real storage area 18C still remains registered in the mapping table and the data—now unnecessary data—still remains in the real storage area 18C. This is an undesirable situation in terms of the effective use of the storage resources.

Figure 4:
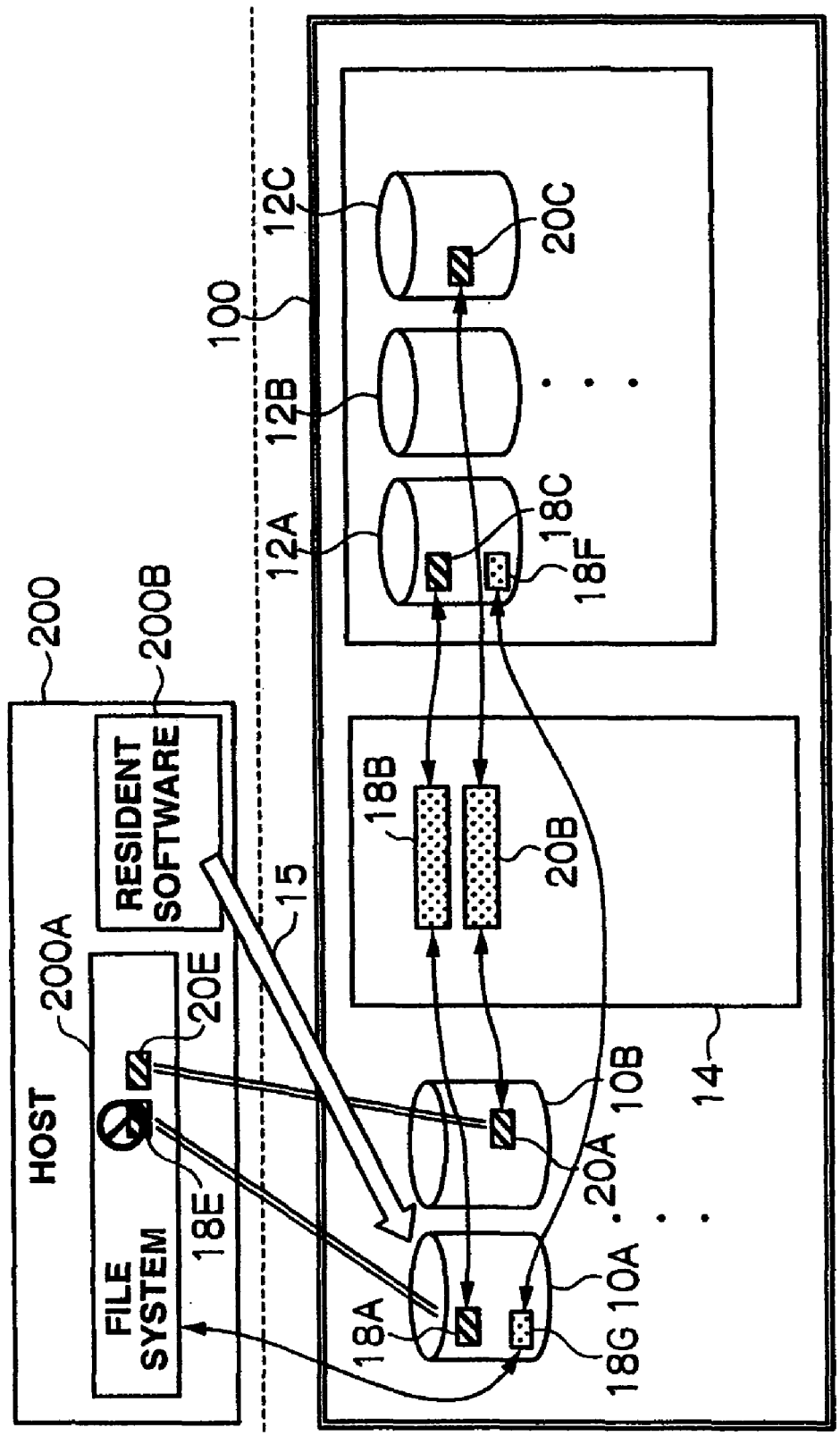
FIG. 4 is a block diagram of the storage system in FIG. 1, explaining the operations according to this invention.

To solve this problem, in FIG. 4, the host 200 has resident software program 200B that sends a write command 15 to the control circuit 100 to write specified data in the storage area 18C mapped onto the logical area 18A, when the file system 200A in the host 200 deletes the management data 18E for the logical area 18A in the virtual volume 10A.

The above-mentioned specified data is the data for enabling the control circuit 100 to recognize that the storage area 18C should be released from mapping onto the logical area 18A in the virtual volume 10A. The control circuit 100 detects the storage area 18C having the specified data, and releases the storage area 18C from mapping onto the logical area 18A in the virtual volume 10A for which the management information 18E has already been deleted by the host 200. This release is performed by deleting the control information 18B in the mapping table 14.

After that, the control circuit 100 regards the storage area 18C as an unused storage area. When the host 200 later writes data in a virtual volume, the control circuit 100 maps the storage area 18C onto the write destination logical volume and stores the write data sent from the host 200 in the storage area 18C. In FIG. 4, an example of the above-described specified data is '0,' which is written in all the bits (all areas) in the storage area 18C.

The search of the pool volumes for a page where '0' is set for all the bits and deletion of the page from the mapping table by the control circuit 100 may be triggered by an event such as the creation of LDEV format or remote copy pair(s), a command sent from the operator, or it may be performed at predetermined timing. The control circuit 100 scans all the logical addresses in each pool volume and searches for a page where '0' is set for all of its bits.

Through FIGS. 2-4, the channel control units 110 shown in FIG. 1 enable access from the host 200 to the virtual volumes 10 and can recognize the real storage areas in the pool volumes that are mapped onto the logical areas in the virtual volumes. The mapping table 14 is stored in the shared memory 120. An operator of the management terminal 160 makes settings for and updates the mapping table, and registers the relevant information in the shared memory 120. Meanwhile, the disk control units 140 store data in the real storage areas and read the data from them. The disk control units 140 can recognize, by referring to the mapping table 14, the logical areas in the virtual volumes that are mapped onto the real storage areas.

However, there is a problem in canceling the mapping of the page where '0' is set for all of its bits, as shown in FIG. 4. This is because there are some cases where '0' is written in all the bits in a page by the write access from the host 200. With the foregoing conventional method, a page like the one above has to be released from mapping onto a virtual volume. In a case like this, even when the host 200 read-accesses the page via the virtual volume, the control circuit 100 can no longer provide the page to the host 200.

Thereupon, in FIG. 4, when the host 200 read-accesses a logical area 18G in a virtual volume, which has not yet been mapped onto a real storage area in a pool volume in the mapping table 14, the control circuit 100 provides a reserved page 18F, which is stored in a pool volume in advance and has '0' set for all of its bits, to the host 200 via the logical area 18G in the virtual volume 10A. Here, the reserved page 18F may be mapped onto the virtual volume 10A.

Figure 5:
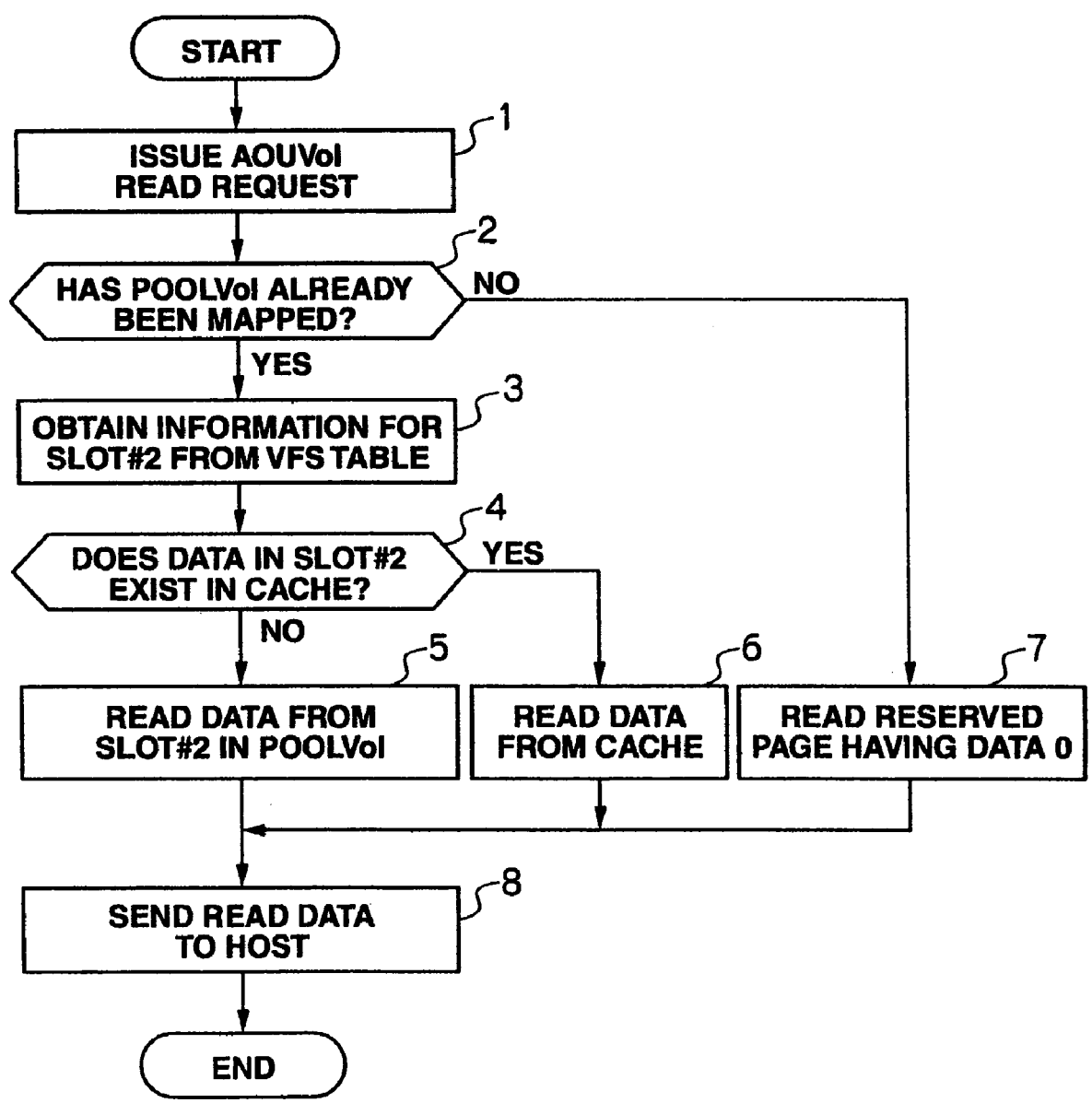
FIG. 5 is a flowchart of the operations performed in the storage system according to a first embodiment in which a cache memory is used for an AOU storage control process.
Figure 6:
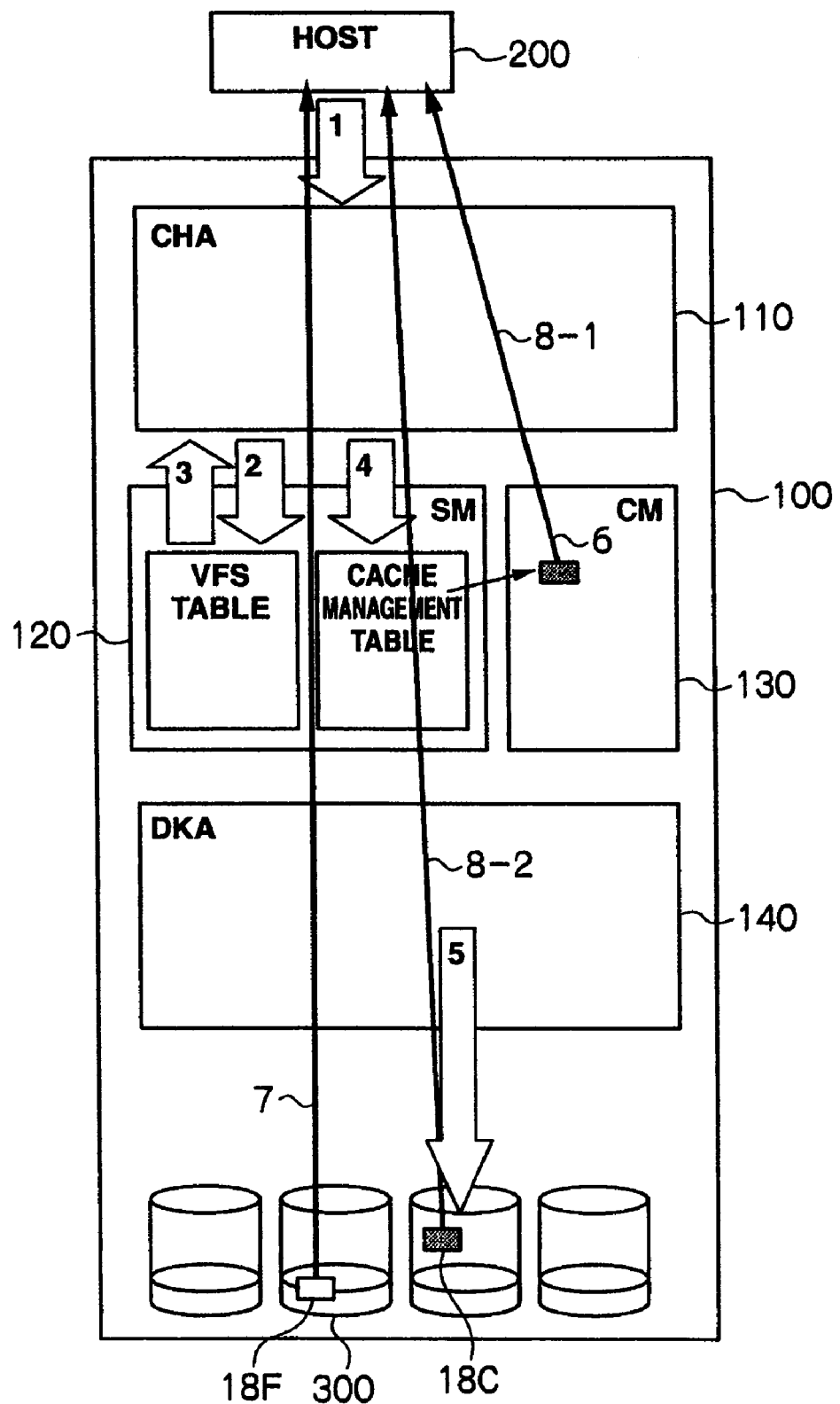
FIG. 6 is a block diagram corresponding to the flowchart in FIG. 5.

Data read/write access via the cache memory 130 will be explained below with reference to FIG. 5. FIG. 5 is a flowchart of the operations performed by the control circuit 100 when a host makes a read request to a virtual volume (hereinafter called 'AOU VOL'). FIG. 6 is a block diagram showing the same operations performed in the storage system. In FIG. 6, the numerals attached to the arrows correspond to the numerals attached to the steps in the flowchart in FIG. 5. Incidentally, in the explanation below, mapping of the logical areas in the virtual volumes to the real storage areas in the pool volumes is performed in units of slots.

The flowchart in FIG. 5 is explained below, with reference also to the block diagram in FIG. 6. First, a host 200 issues a read request to the relevant channel control unit 110, requesting reading of data from an AOU VOL (1). The channel control unit 110 refers to the mapping table (VFS table) in the shared memory 120, and judges whether or not any slot ('slot#2') in a pool volume is mapped onto the host-accessed AOU VOL (2).

If the judgment is negative, the channel control unit 110 reads a reserved page from a pool volume and provides it to the host 200 (7). Meanwhile, if the judgment in (2) is positive, the channel control unit 110 obtains, from the mapping table 14, unique information for that slot#2 in the pool volume (i.e., the ID of the pool volume and the logical address of the slot#2 in the pool volume) (3).

Incidentally, FIG. 7 is a management table for the cache memory 130 storing the read data. This cache management table stores the correspondence relationships between the unique information for each slot#2 and its cache management information (addresses in the cache memory, data attributes, queue information, etc.). This table is stored in the shared memory 120.

Next, the channel control unit 110 judges, by referring to the cache management table, whether or not the unique information for the subject slot#2 obtained from the mapping table 14 is stored in the cache management table (4). If the judgment is positive, the relevant channel control unit 110 judges that the data in the slot#2 exists in the cache memory 130, obtains the information for the relevant cache area from the cache management table, accesses that cache area, and reads the data from it (6). Then the channel control unit 110 sends it to the host 200 (8 in FIG. 5, 8-1 in FIG. 6).

Meanwhile, if the channel control unit 110 judges that the unique information for the slot#2 is not stored in the cache management table, the data in the slot#2 does not exist in the cache memory 130, so the relevant disk control unit 140 accesses the slot#2 in the pool volume and reads the data from it (5). Then the channel control unit 110 sends the data to the host 200 (8 in FIG. 5, 8-2 in FIG. 6). The channel control unit 110 then registers the unique information and cache management information for the slot#2 in the cache management table (4).

According to the procedure described in FIGS. 5-7, the cache memory is used for AOU control; accordingly, the control circuit 100 can send data to a host 200 promptly in response to a read request. In conventional AOU control, data in the areas in the virtual volumes have to be read from the corresponding areas in the pool volumes by referring to the mapping table, which may cause overhead. However, with this invention, this overhead can be prevented by using the cache memory.

Figure 8:
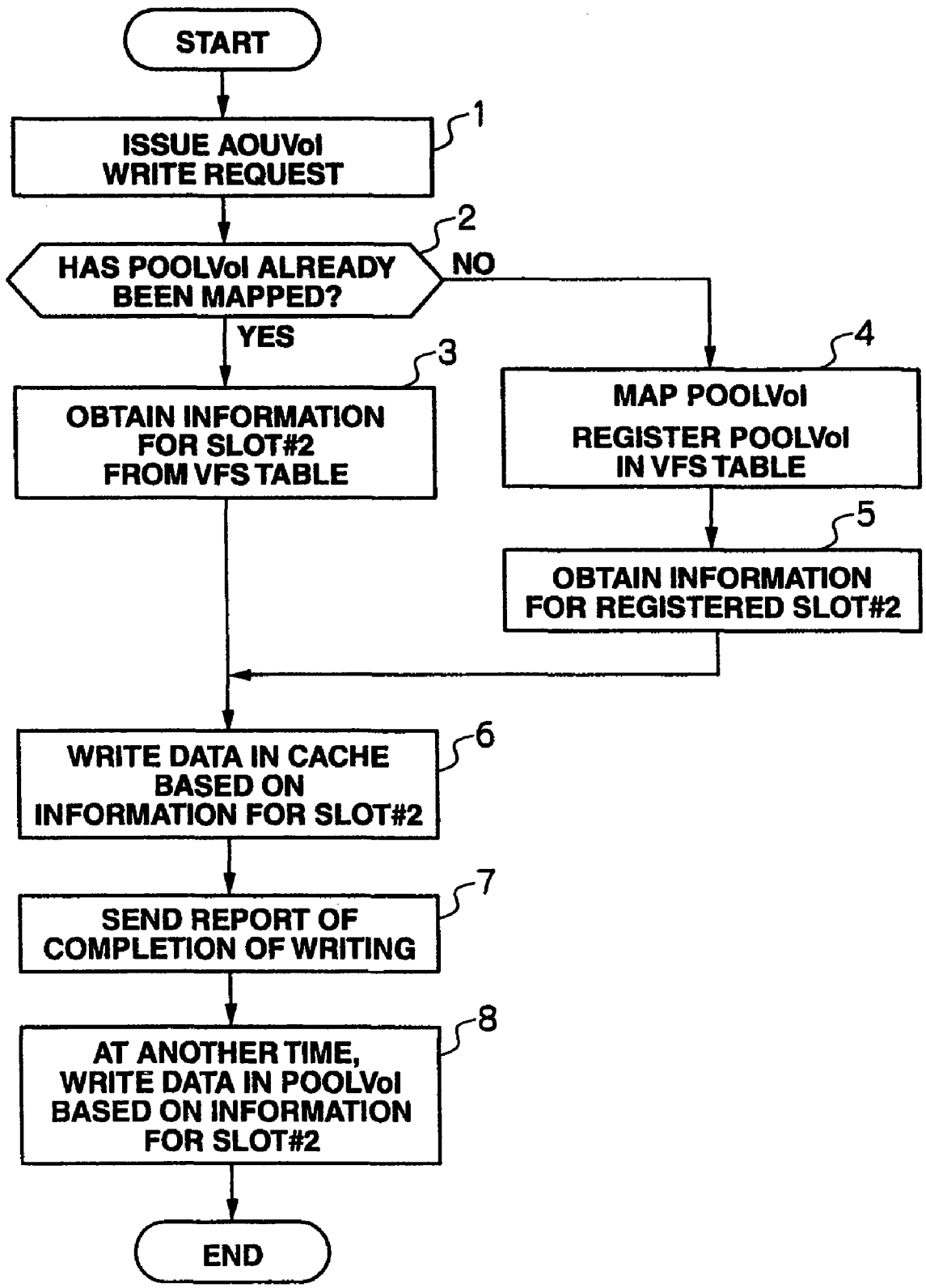
FIG. 8 is a flowchart of the operations performed in the storage system according to a second embodiment, in which the cache memory is used for an AOU storage control process.
Figure 9:
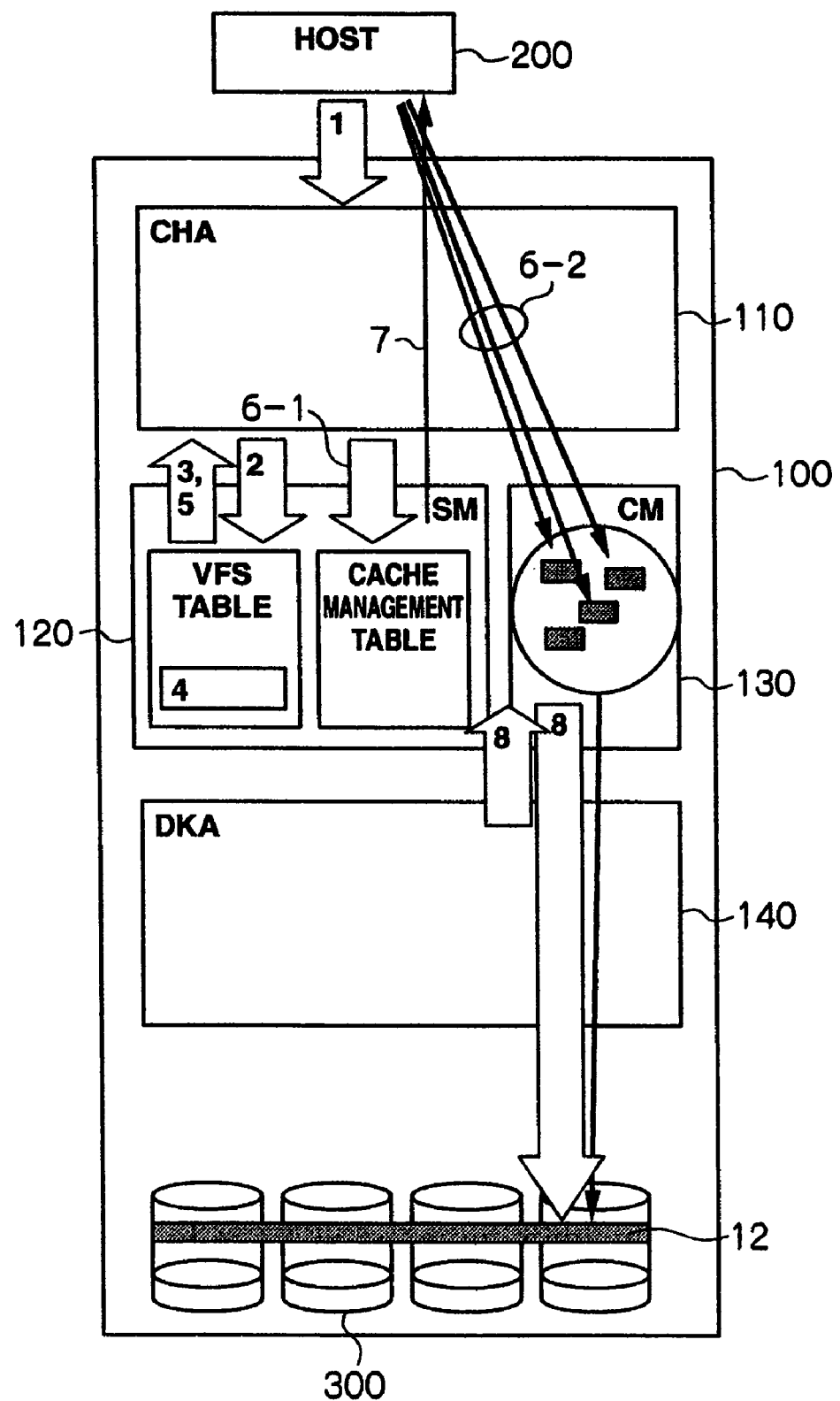
FIG. 9 is a block diagram corresponding to the flowchart in FIG. 8.

FIG. 8 is a flowchart of the operations performed when a host 200 write-accesses a slot ('slot#1') in an AOU VOL (1). FIG. 9 is a block diagram corresponding to the flowchart in FIG. 8. When any slot#2 in a pool volume is not mapped onto the host-accessed slot#1 in the AOU VOL in the mapping table 14 (2), the relevant channel control unit 110 registers a new slot#2 in a pool volume in the mapping table 14 (4), and obtains the unique information for that slot#2 (5). The channel control unit 110 also registers the unique information for the slot#2 in the cache management table (6-1 in FIG. 9) and writes the write data, which is sent from the host 200, in the cache memory 130 (6 in FIG. 8, 6-2 in FIG. 9). The channel control unit 110 then sends a write completion report to the host 200 (7). At different timing from the writing of the write data to the cache memory 130, the disk control unit 140 writes the write data in the cache memory 130 in the slot#2 in the pool volume 12 based on the unique information for the slot#2 by referring to the cache management table (8), the slot#2 being set for more than one storage device.

If it is judged in (2) that a slot#2 in a pool volume is mapped onto the slot#1 in the AOU VOL, the channel control unit 110 obtains the logical address of the slot#2 from the mapping table 14 (3), and writes the write data in the cache memory (6).

Figure 11:
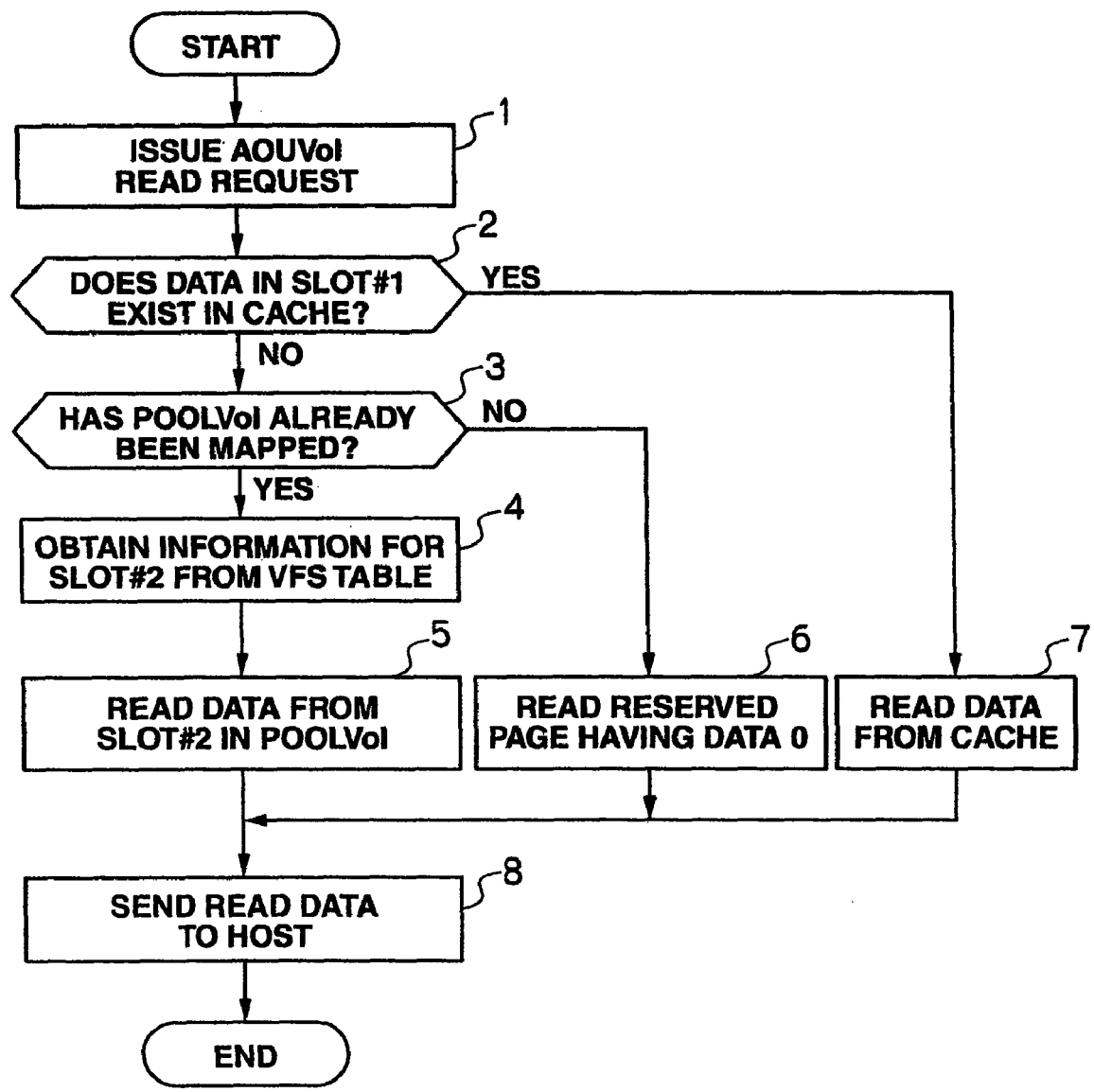
FIG. 11 is a flowchart of the operations performed in the storage system according to a third embodiment, in which the cache memory is used for the AOU storage control process.
Figure 12:
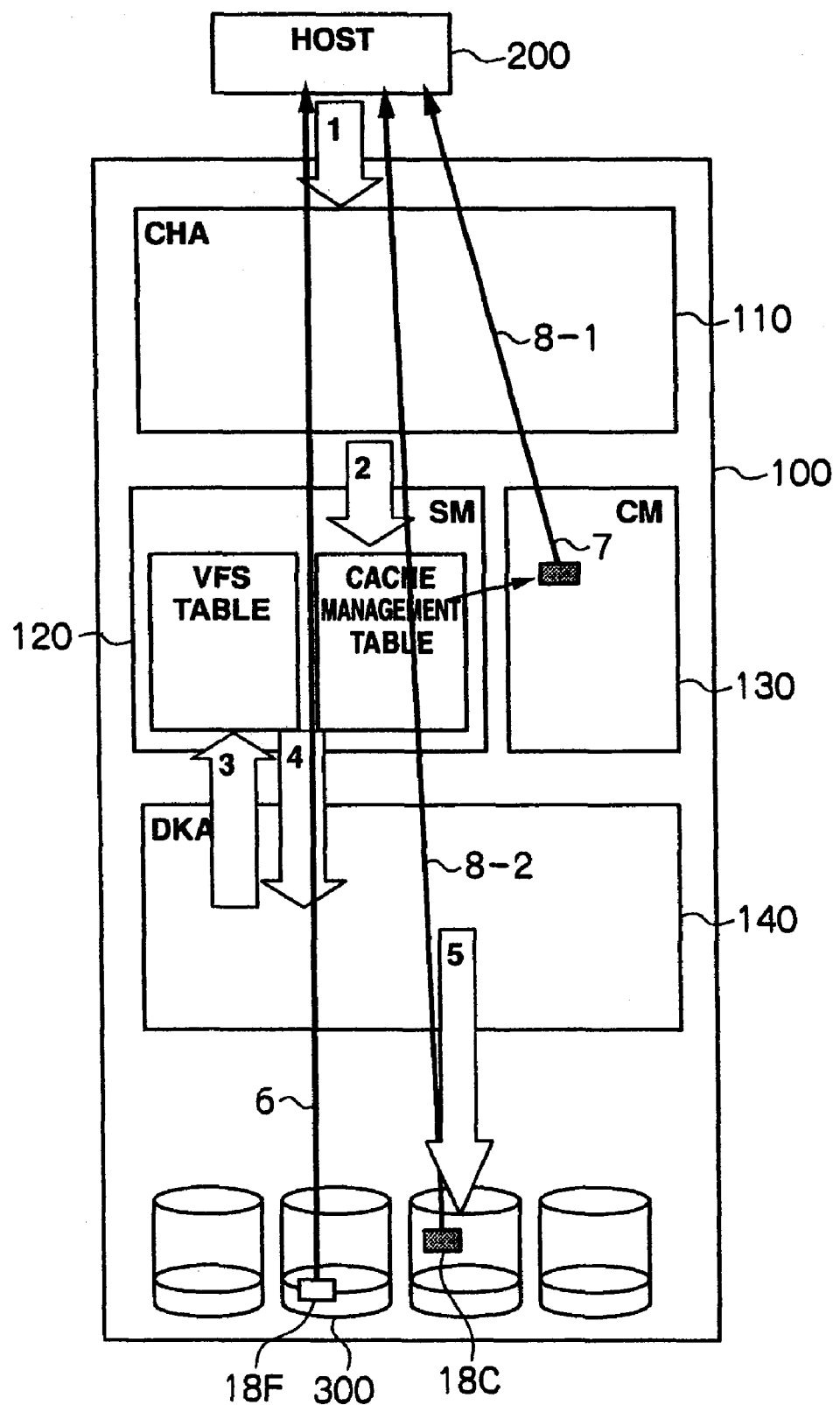
FIG. 12 is a block diagram corresponding to the flowchart in FIG. 11.

In the foregoing example, the cache areas in the cache memory 130 are managed by being associated with slots#2 in pool volumes as shown in the cache management table in FIG. 7. Next, an embodiment where the cache areas in the cache memory 130 are managed by being associated with slots#1 in AOU VOLs will be explained. FIG. 11 is the flowchart for that example and FIG. 12 is a block diagram corresponding to the flowchart in FIG. 11.

When a host 200 makes a read request to a slot#1 in an AOU VOL (1), the relevant channel control unit 110 judges whether or not the slot#1 is registered in the cache management table in FIG. 13 (2). If the judgment is positive, the channel control unit 110 reads, by referring to the cache management table, the read target data from the cache area for the slot#1 (7) and sends it to the host 200 (8).

Meanwhile, if the slot#1 is not registered in the cache management table, the relevant disk control unit 140 judges whether or not any slot#2 in a pool volume is mapped onto the slot#1 (3). If the judgment is negative, the channel control unit 110 reads a reserved page 18F from a pool volume via the disk control unit 140 (6), and provides it to the host 200 (8). Meanwhile, if a slot#2 in a pool volume is mapped onto the slot#1, the disk control unit 140 obtains the information for the slot#2 from the mapping table 14.

Then the disk control unit 140 reads the read target data from the logical address of the slot#2 (18C) in the pool volume (5) and sends it to the host 200 in response to the read request (8).

Figure 14:
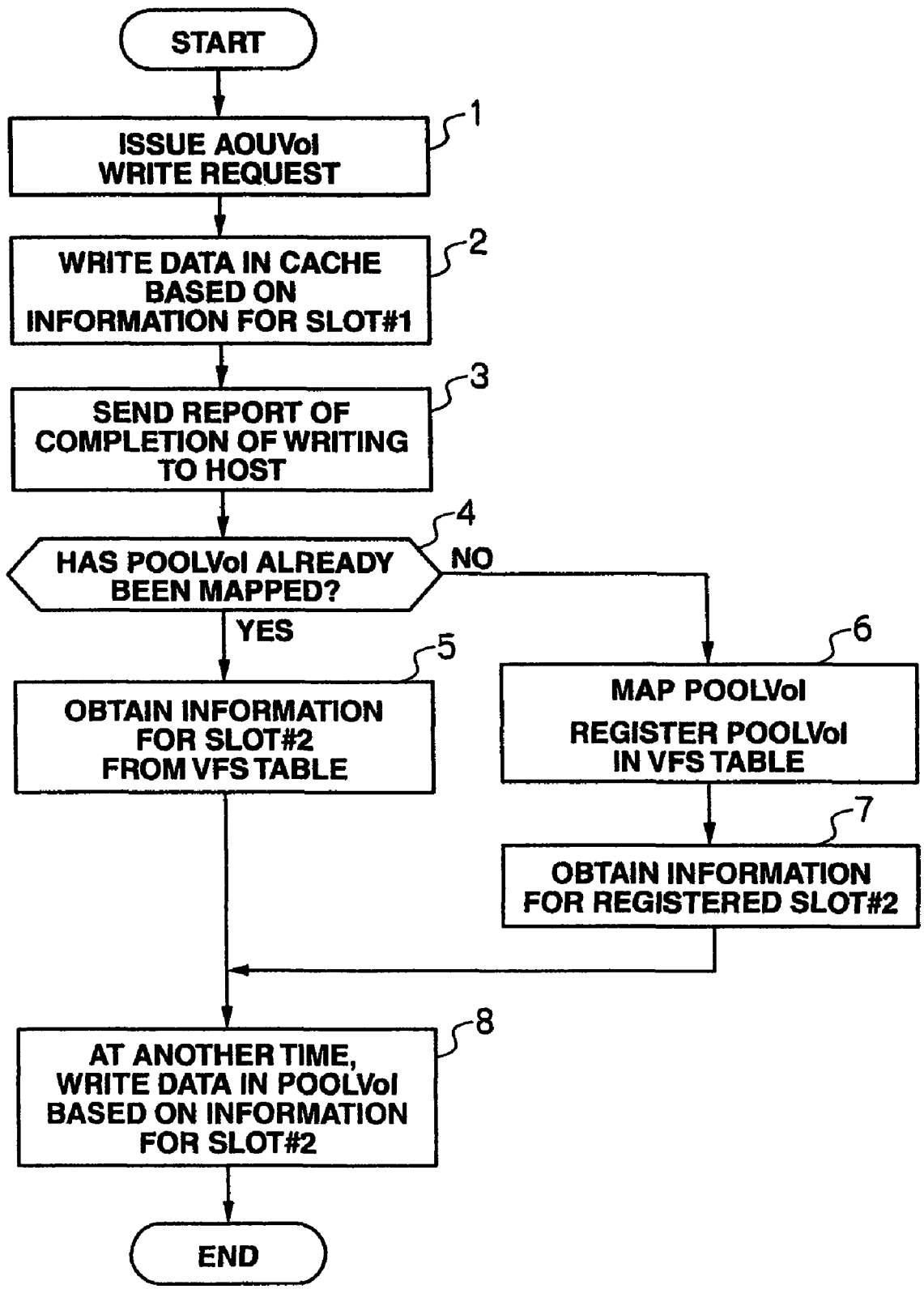
FIG. 14 is a flowchart of the operations performed in storage system according to a fourth embodiment, in which the cache memory is used for the AOU storage control process.
Figure 15:
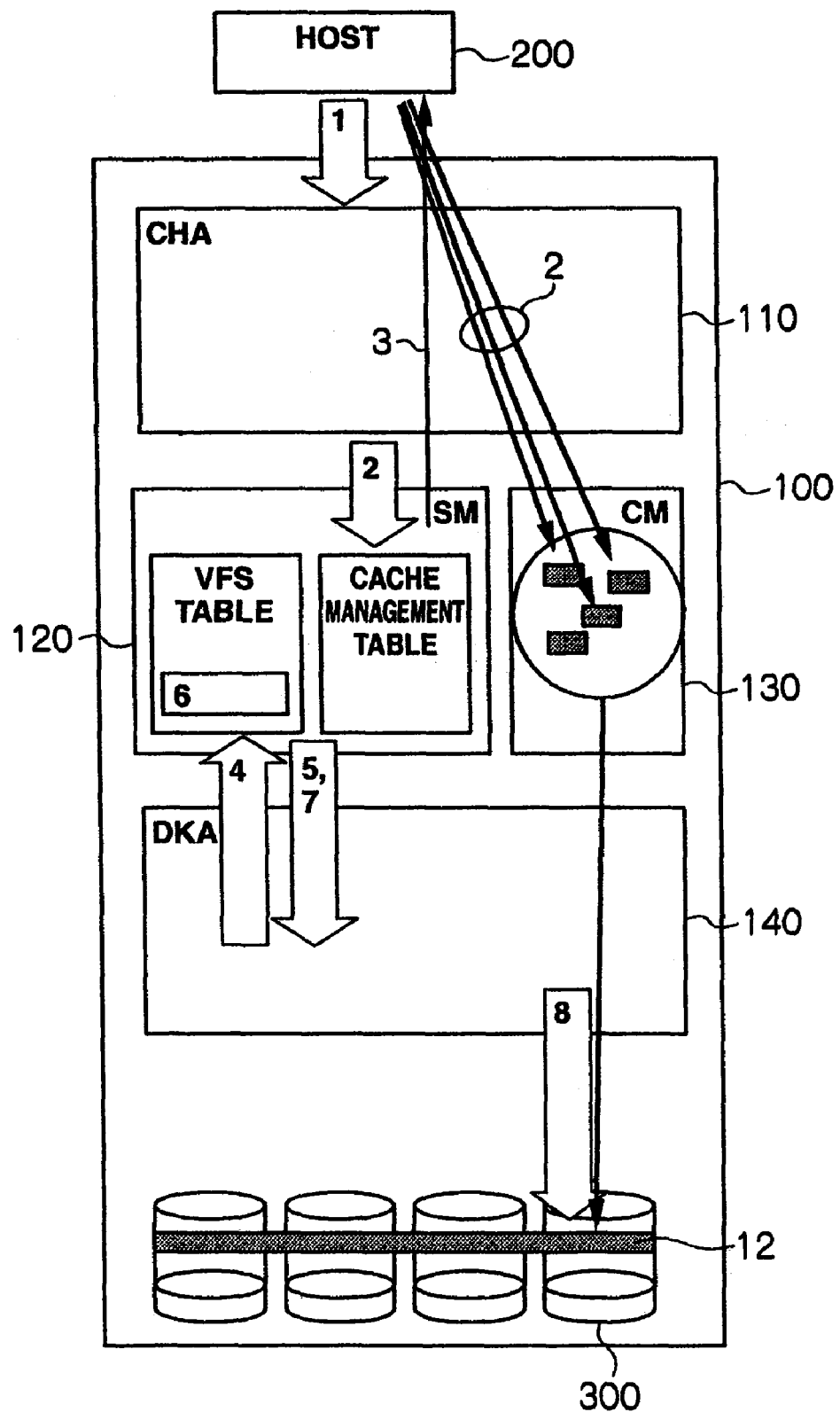
FIG. 15 is a block diagram corresponding to the flowchart in FIG. 14.

FIG. 14 is a flowchart of the operations performed when a host 200 write-accesses an AOU VOL, and FIG. 15 is a block diagram corresponding to the flowchart in FIG. 14. When a host 200 write-accesses an AOU VOL (1), the relevant channel control unit 110 registers a write destination logical area (slot#1) in the cache management table in FIG. 13 and the write data in the cache area designated in the cache management table (2). Then the channel control unit 110 sends a report indicating completion of data writing to the host 200 (3).

When destaging the data in the cache memory 130 to a pool volume, the relevant disk control unit 140 judges whether or not any slot#2 in a pool volume is mapped onto the slot#1. If the judgment is negative, the disk control unit 140 registers a slot#2 in a pool volume in the mapping table 14 (6). The disk control unit 140 then obtains the unique information for the slot#2, such as the address of the slot#2 (7), and writes the write data in the area of the slot#2 in the pool volume based on that information (8). Meanwhile, when the disk control unit 140 judges that a slot#2 in a pool volume is mapped onto the slot#1 in the mapping table, it obtains the unique information for the slot#2 from the mapping table 14 (5). It then writes the write data in the area of the slot#2 in the pool volume (8).

Figure 16:
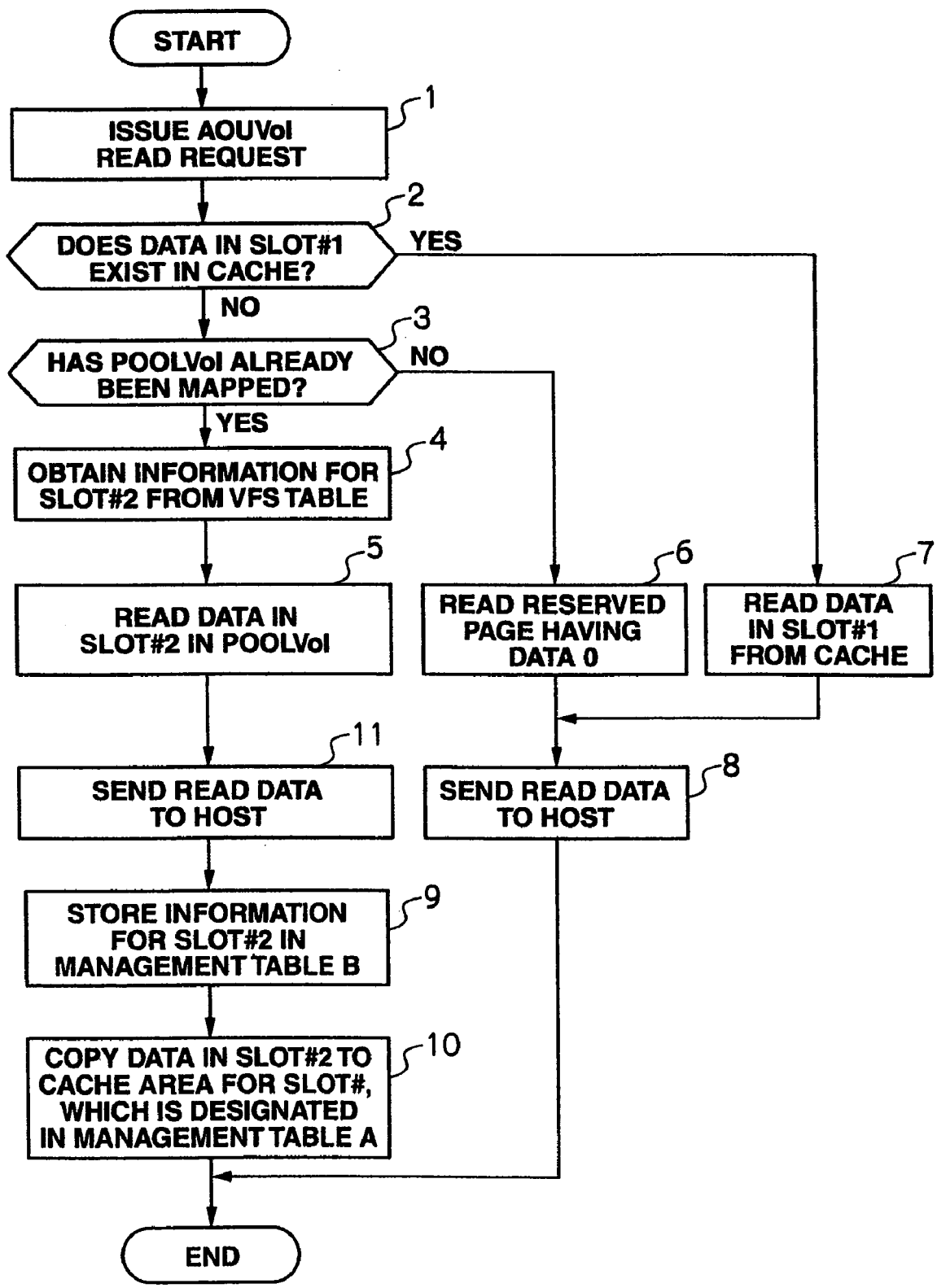
FIG. 16 is a flowchart of the operations performed in the storage system according to a fifth embodiment, in which the cache memory is used for the AOU storage control process.
Figure 17:
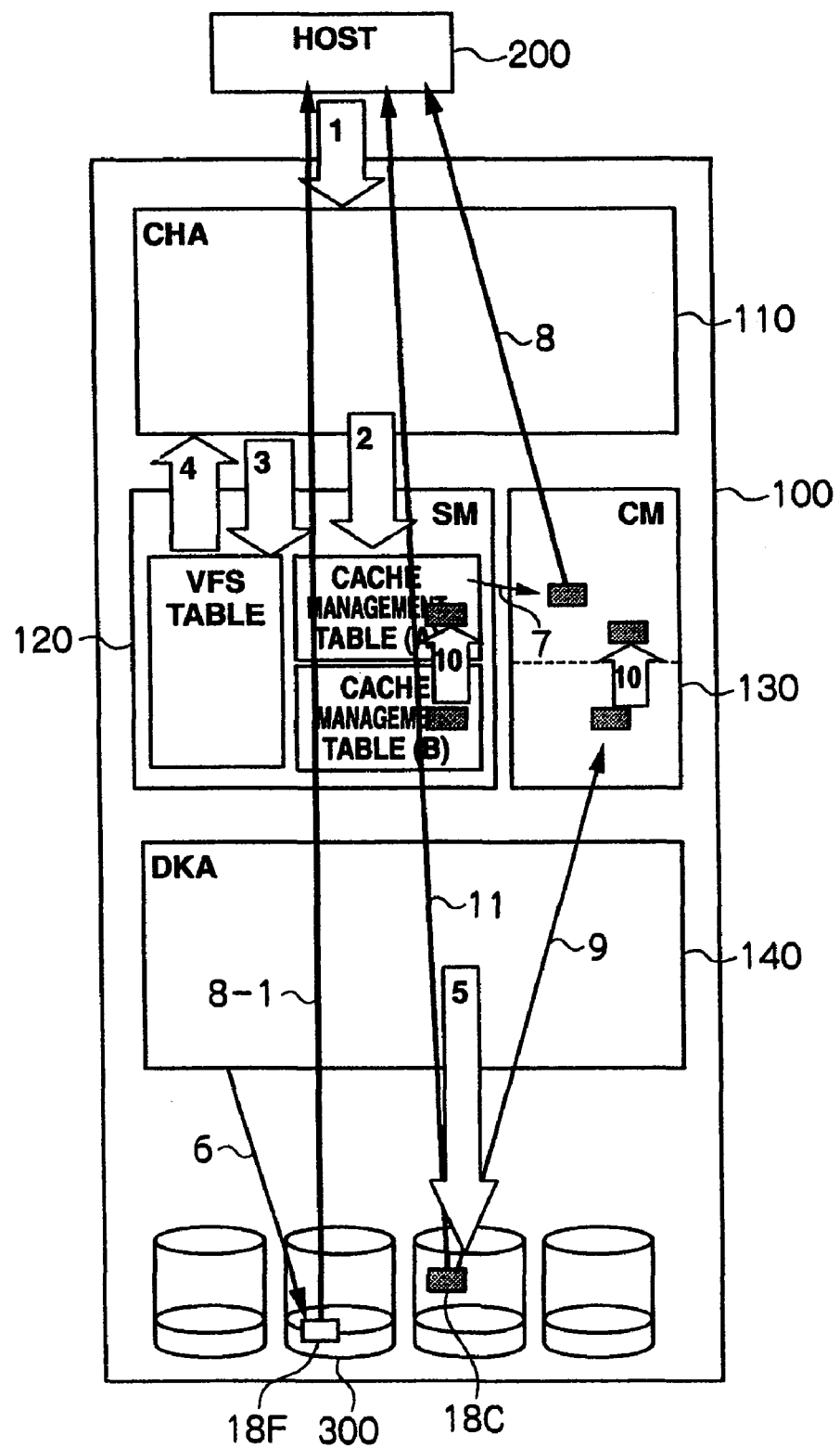
FIG. 17 is a block diagram corresponding to the flowchart in FIG. 16.

FIGS. 16 and 17 show an embodiment where the cache areas in the cache memory 130 are managed by being associated with both the slots#1 in the AOU VOLs and slots#2 in the pool volumes. FIG. 16 is a flowchart of the operations performed when a host 200 read-accesses a slot#1 in an AOU VOL (1). FIG. 17 is a functional block diagram of the storage system corresponding to the flowchart in FIG. 16.

The relevant channel control unit 110 judges whether or not the data in the slot#1 in the AOU VOL exists in the cache memory 130 (2). If the judgment is positive, the channel control unit 110 reads, by referring to the cache management table (A) in FIG. 13, the data in the slot#1 from the cache memory 130, and sends it to the host 200 (8).

Meanwhile, if the channel control unit 110 judges that the data in the slot#1 does not exist in the cache memory 130 (2), it judges, by referring to the mapping table 14, whether or not there is any slot#2 in a pool volume that is mapped onto the slot#1 (3). If the judgment is negative, the channel control unit 110 reads a reserved page 18F in a pool volume, where '0' is set for all of its bits, via the relevant disk control unit 140 (6) and sends it to the host 200 (8 in FIG. 16, 8-1 in FIG. 17).

Meanwhile, if the channel control unit 110 judges that a slot#2 in a pool volume is mapped onto the slot#1 in the mapping table 14, it obtains the information for the slot#2 from the mapping table 14 (4). Then the disk control unit 140 reads the data from the area of the slot#2 (18C) in the pool volume (5), and sends it to the host 200 in response to the read request (11).

Then the channel control unit 110 stores the unique information for the slot#2 in the cache management table (B) in FIG. 7 as being mapped onto an address in the cache memory 130 and writes the data read from the slot#2 in the pool volume in the cache memory 130 (9). The channel control unit 110 then copies the cache management information for the slot#2 from the cache management table (B) to the cache management table (A) and copies, in the cache memory 130, the data in the cache area for slot#2 to the cache area for the slot#1 (10).

Accordingly, after that, when there is read access from a host 200 to the slot#1, the channel control unit 110 can send desired data stored in the cache memory 130 to the host 200 promptly, without having to refer to the pool volumes in the storage devices 300.

Figure 18:
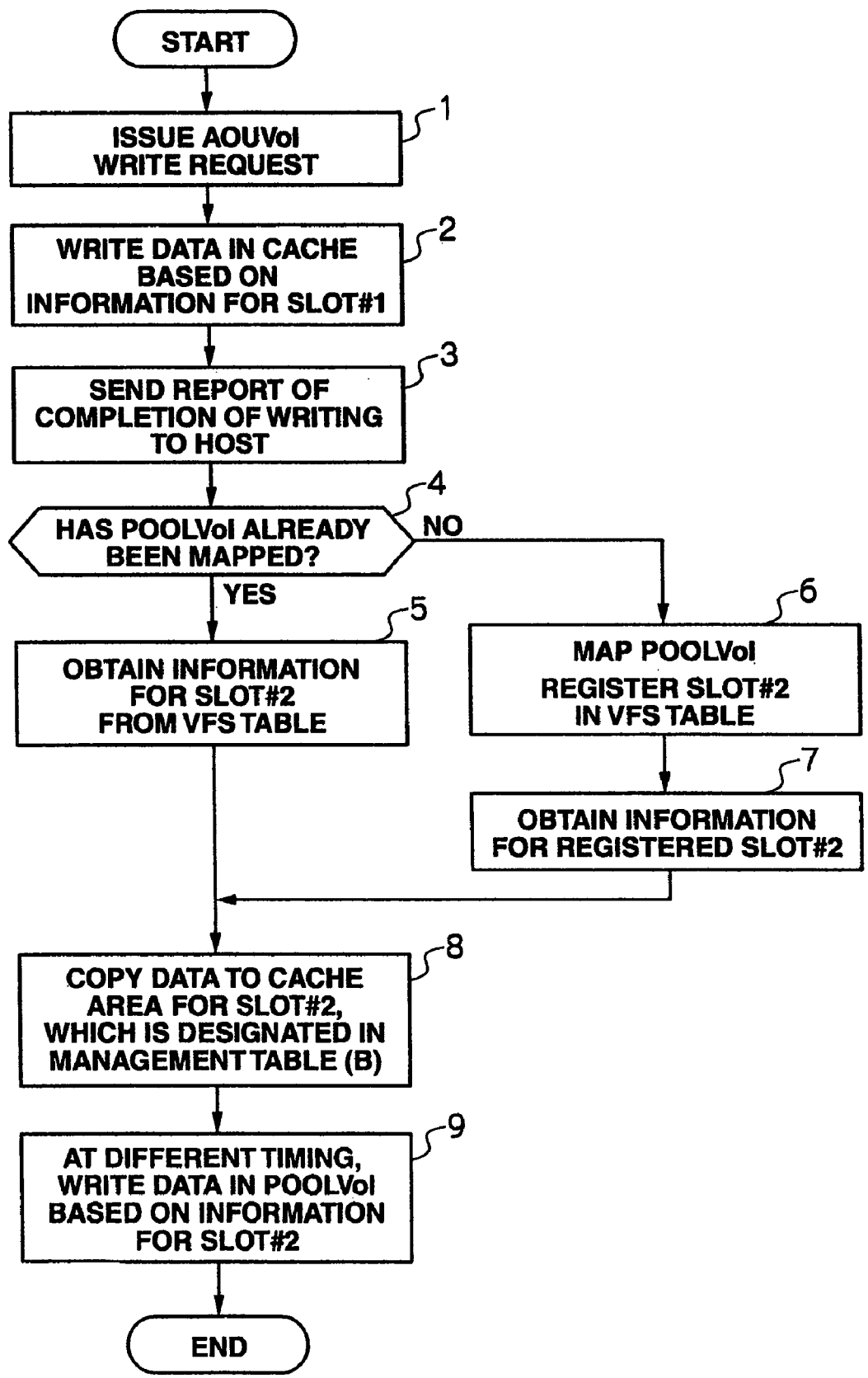
FIG. 18 is a flow chart of the operations performed in the storage system according to a sixth embodiment, in which the cache memory is used for the AOU storage control process.
Figure 19:
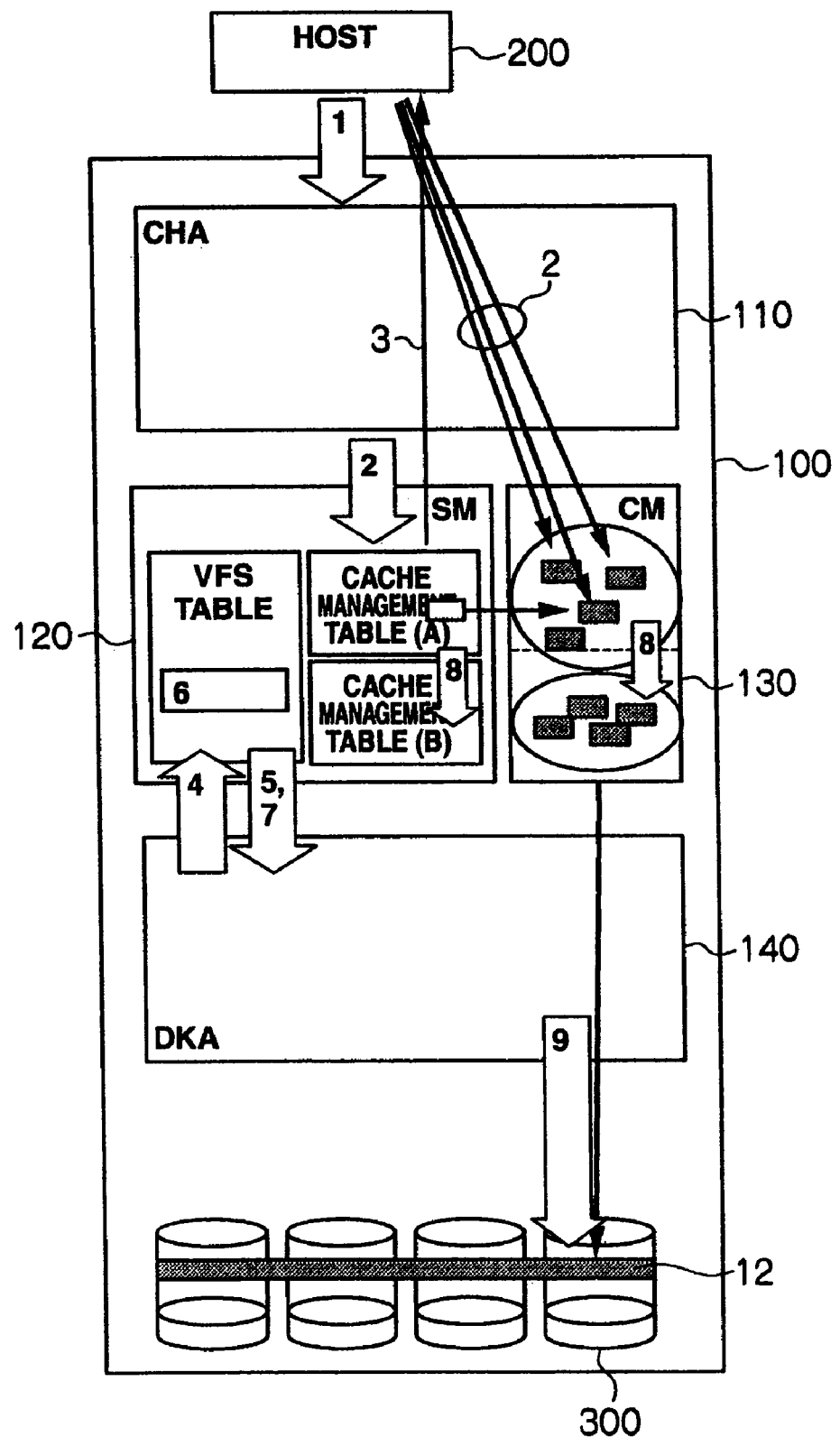
FIG. 19 is a block diagram corresponding to the flowchart in FIG. 18.

In comparison to the case of read access in FIG. 17, FIGS. 18 and 19 show an example where a host 200 write-accesses a slot#1 in an AOU VOL. When the relevant channel control unit 110 receives a write request for the slot#1 in the AOU VOL from the host 200 (1), it writes the write data in the cache area in the cache memory 130 corresponding to the write destination slot#1 by referring to the cache management table (A) (2). The channel control unit 110 then sends a report indicating completion of data writing to the host 200.

The relevant disk control unit 140 judges, by referring to the mapping table 14, whether or not any slot#2 in a pool volume is mapped onto the slot#1 (4). When the judgment is negative, the disk control unit 140 registers a slot#2 in a pool volume in the mapping table. Then the disk control unit 140 obtains the unique information for the slot#2 (7). Meanwhile, if a slot#2 is mapped onto the slot#1 in the mapping table 14, the disk control unit 140 obtains the unique information for the slot#2 in the pool volume from the mapping table (5). Then the disk control unit 140) registers the unique information for the slot#2 in the cache management table (B), copies the cache management information for the slot#1 from the cache management table (A) to the cache management table (B), and registers it as the cache management information for the slot#2. Then the channel control unit 110 copies or migrates the write data from the cache area designated in the cache management table (A) to the cache area designated in the cache management table (B) (8).

After a predetermined period of time, the disk control unit 140 obtains the cache management information for the slot#2 from the cache management table (B), and writes the write data in the specific cache area in the cache memory 130 to the slot#2 in the pool volume (9).

Figure 10:
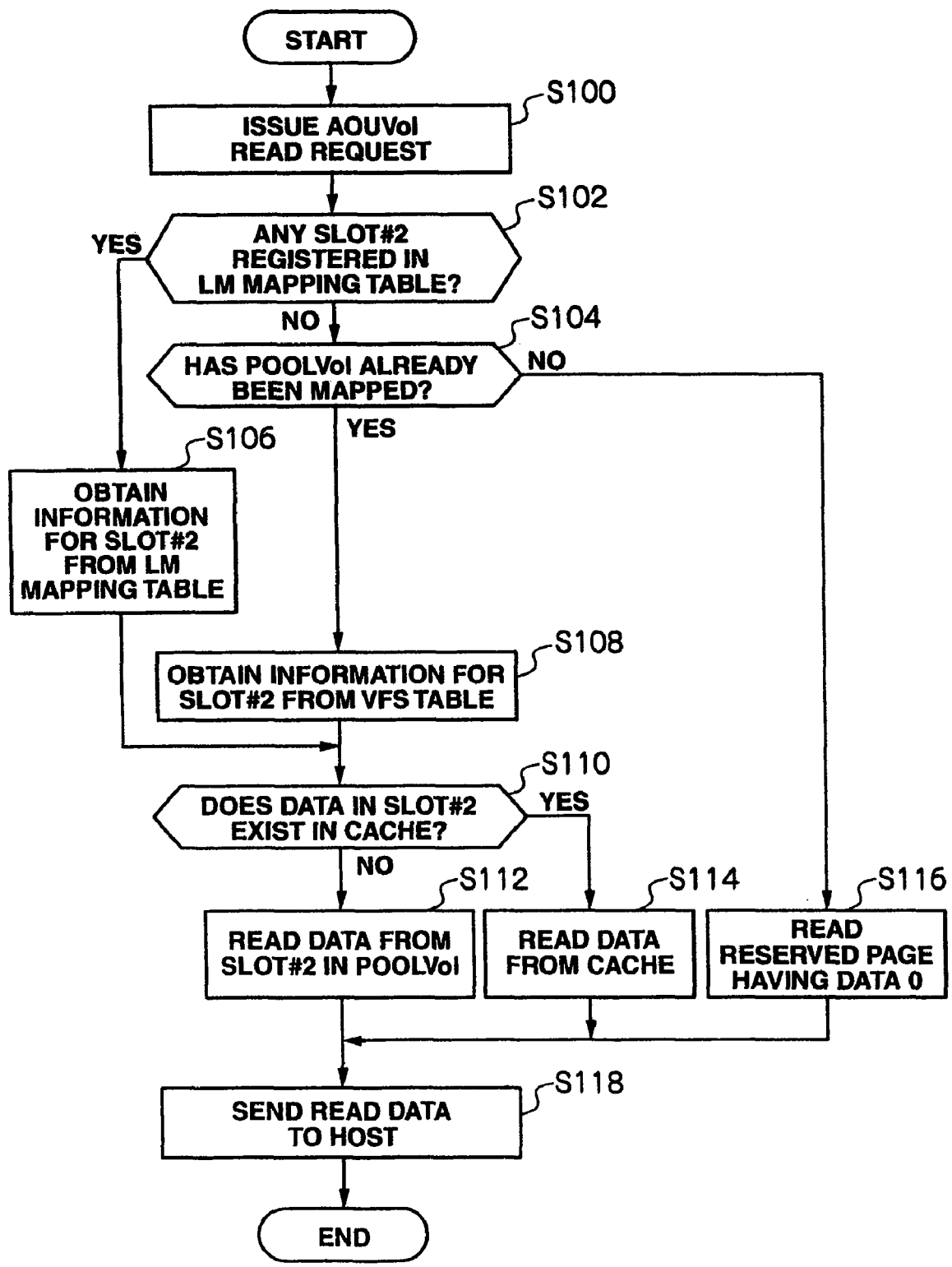
FIG. 10 is a flowchart for the operations performed in the storage system according to an example where a mapping table storing the correspondence relationships between virtual volume areas and pool volume areas is stored in the local memory in each channel control unit.

FIG. 10 is a flowchart for the operations in the control circuit 100 according to an example where the mapping table, which is usually stored in the shared memory 120, is also stored in the local memory in the channel control units 110 When the relevant channel control unit 110 receives a read request for a slot#1 in an AOU VOL from a host 200 (S100), it judges whether or not any slot#2 is mapped onto the slot#1 in the local memory (LM) mapping table (FIG. 20) in its own local memory (S102).

When the judgment is positive, the channel control unit 110 obtains the unique information for the slot#2 from its LM mapping table (S106). Meanwhile, if the judgment is negative, the channel control unit 110 judges, by referring to the mapping table (VFS table) in the shared memory 120, whether or not any slot#2 in a pool volume is mapped onto the slot#1 (S104). If the judgment is negative, the channel control unit 110 reads a reserved page in a pool volume where '0' is set for all the bits (S116). If the judgment is positive, the channel control unit 110 obtains the unique information for the slot#2 from the VFS table (S108).

The channel control unit 110 then judges whether or not the slot#2 is registered in the cache management table, i.e., whether or not the data in the slot#2 exists in the cache memory 130 (S110). If the judgment is positive, the channel control unit 110 reads the data from the cache memory 130 (S114) and sends it to the host 200 (S118). If the judgment is negative, the channel control unit 110 reads the read target data from the slot#2 in the pool volume (S112) and sends it to the host 200 (S118).

The display on a monitor presented to a system administrator regarding the expansion of storage devices in the AOU system is explained below. Examples of the information used when making a decision to expand the storage devices include the percentage of in-use pool volumes—the percentage of in-use real storage areas existing in the pool volumes—and the in-use portion of each virtual volume.

Figure 21:
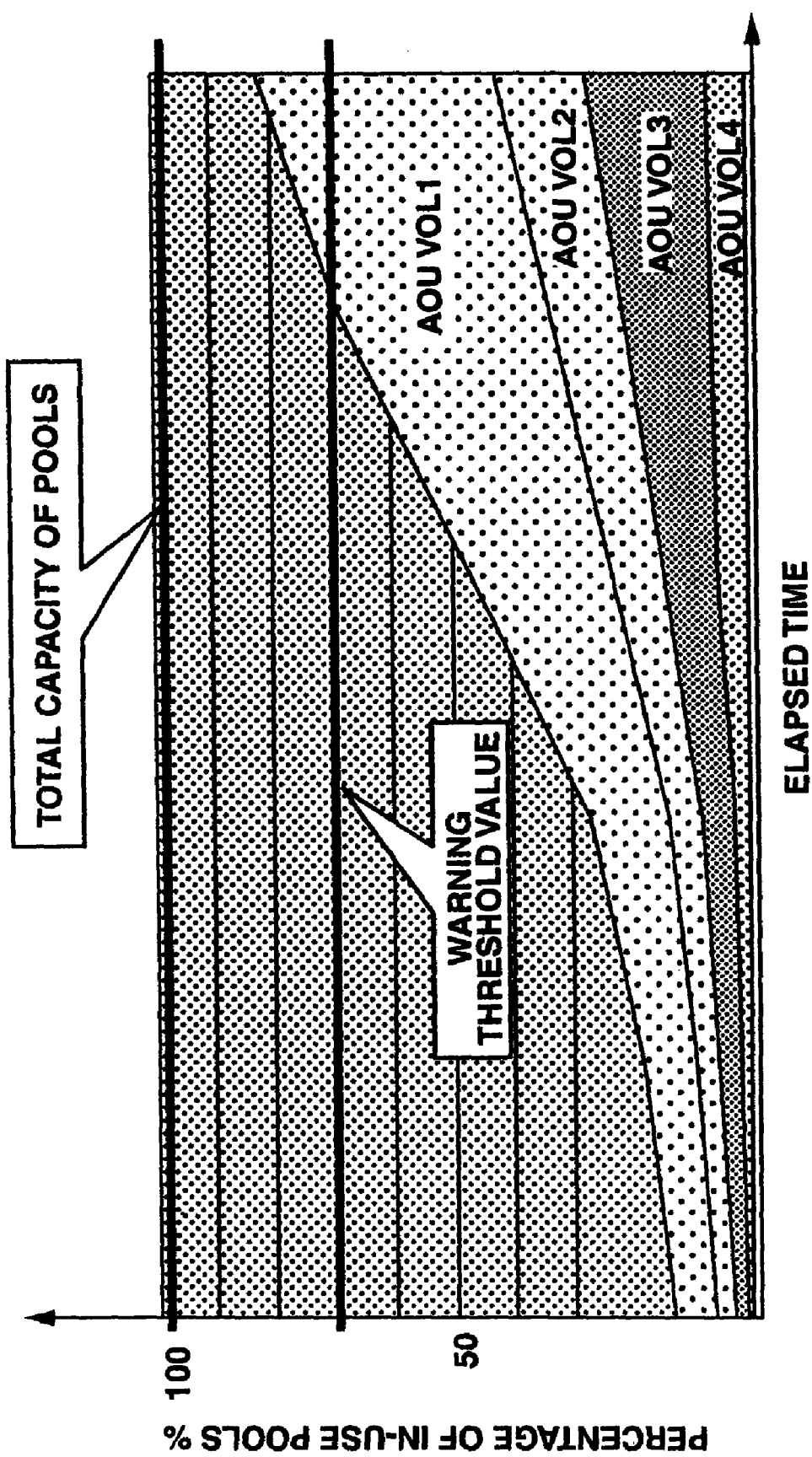
FIG. 21 is an example of a monitor display for managing the relationships between the time elapsed since the pool volumes came to be used for AOU volumes (virtual volumes), the percentage of in-use pool volumes, and the threshold value for issuing a warning.

The percentage of in-use pool volumes is explained below. In the display on the monitor in FIG. 21 (the monitor of the management terminal 160), the relationships between the time elapsed since the pool volumes came to be used for AOU volumes (virtual volumes), the percentage of in-use pool volumes, and a threshold value for issuing a warning is managed. By having the management terminal 160 output a message prompting the expansion of the storage devices 300 when the percentage of in-use pool volumes exceeds the warning threshold value, the scale of expansion of the pool volumes can be estimated.

The in-use portion of each AOU volume will be explained next. Of the total capacity of each AOU volume, only the portion storing actual data (i.e., the portion mapped onto pages) is displayed on the monitor on the management terminal 160. With this display, the management terminal 160 can compare the data usage amount the hosts 200 recognize and the data usage amount the control circuit 100 recognizes. When there is a gap between these two, i.e., when many unnecessary files remains mapped onto pages by the control circuit 100, the management terminal 160 can be aware of that situation and the system administrator can determine the timing for performing unnecessary area deletion (deletion of pages where all bits are set to '0').

In the foregoing examples, a resident, data-managing program in the hosts sends an order to the control circuit to set '0' for all the bits in a real storage area; however, the control circuit may check the management information in the file system in the hosts at regular time intervals and, based on the check result, set '0' for all the bits in a real storage area released from mapping onto a virtual volume. Moreover, open-type or mainframe type hosts may also be used in the storage system.

What is claimed is:

1. A storage controller having a control circuit for controlling the migration of data between a host system and a storage apparatus, the migration being performed in response to a data write request or data read request sent from the host system to the storage apparatus, said control circuit comprising,
a first volume accessible by the host system, having no real storage area in the storage apparatus allocated thereto;
a second volume having a plurality of real storage areas allocated thereto; and
a control table defining the correspondence relationships between logical areas in the first volume the host system accesses and the real storage areas in the second volume,
when the host system makes a request to write data in a logical area, to which a real storage area is not allocated before the request to write data, in the first volume, the control circuit allocates a real storage area in the second volume to the logical area in the first volume and registers the relationship between the logical area in the first volume and the real storage area in the second volume in the control table,
when the host system makes a request to read data from the logical area in the first volume, the control circuit reads, by referring to the control table, data from the real storage area in the second volume corresponding to the read-requested logical area and provides it to the host system,
wherein a first real storage area storing a first data and included in the second volume is related to a first logical area in the first volume,
wherein the control circuit detects a certain logical area in the first volume to which a certain real storage area storing data that is the same as the first data is allocated, and releases the certain real storage area from allocation to the certain logical area after which the released certain real storage area can be used for allocating to another logical area in the first volume or in another first volume as a destination of another write access request.

2. A storage controller according to the claim 1, wherein the second volume is a storage pool provided by a plurality of storage devices.

3. A storage controller according to the claim 1, wherein the control circuit receives a file access request to the first volume from the host system.

4. A storage controller according to the claim 1, wherein the control circuit receives a block access request to the first volume from the host system.

5. A storage controller according to the claim 1, wherein after releasing the certain real storage area from allocation to the certain logical area, the control circuit allocates the first real storage area to the certain logical area for responding to a request to read data from the certain logical area.

6. A storage controller according to the claim 1, wherein the first data is a specific data.

7. A storage controller according to the claim 6, wherein the specific data is a data pattern configured by zero data.

8. A storage system comprising
a plurality of storage devices; and
a storage controller being configured to manage a storage pool, to which a plurality of real storage areas provided by the plurality of storage devices are allocated, and a volume accessible by a host system including a plurality of logical areas;
wherein:
the storage controller, in response to a request to write data in a logical area to which a storage area in the storage pool is not allocated before receiving the request, is configured to allocate a real storage area in the storage pool to the volume for writing data to the allocated real storage area,
the storage controller, in response to a request to read data from the logical area in the volume, is configured to read data from the real storage area allocated to the requested logical area, a first real storage area storing a first data is allocated to a first logical area in the volume, the storage controller is configured to detect a certain logical area, in the volume to which a certain real storage area storing data that is the same as the first data is allocated, and release the certain real storage area from allocation to the certain logical area after which the released certain real storage area can be used for allocating to another logical area in the volume or in another volume as a destination of another request to write data.

9. A storage system according to the claim 8,
wherein the storage controller receives a file access request to the volume from the host system.

10. A storage system according to the claim 8,
wherein the storage controller receiving a block access request to the volume from the host system.

11. A storage system according to the claim 8, wherein after releasing the certain real storage area from allocation to the certain logical area, the storage controller is configured to allocate the first real storage area to the certain logical area for responding to a request to read data from the certain logical area.

12. A storage system according to the claim 8, wherein the first data is a specified data.

13. A storage system according to the claim 12, wherein the specified data is a data pattern of all zero data.

14. A storage system according to the claim 8, wherein the storage controller is configured to send a specified data in response to a request to read data from the certain logical area, which is in the volume and from which allocation of the certain real storage area in the storage pool is released.

15. A storage system according to the claim 8,
the storage controller is configured to allocate a real storage area in the storage pool to the volume on a predetermined unit basis for writing data to the allocated real storage area.

16. A method for a storage controller coupled to plurality of storage devices comprising:

managing a storage pool to which a plurality of real storage areas provided by the plurality of storage devices is allocated, and a volume accessible by a host system including a plurality of logical areas;

allocating, in response to receiving a request to write data in a logical area to which a storage area in the storage pool is not allocated before receiving the request, a real storage area in the storage pool to the logical area in the volume for writing data to the allocated real storage area;

reading, in response to receive a request to read data from the logical area in the volume, data from the real storage area allocated to the requested logical area;

detecting a certain logical area in the volume to which a certain real storage area storing data that is the same as a first data is allocated, the first data being stored in a first real storage area which is allocated to a first logical area in the volume; and releasing the certain real storage area from allocation to the certain logical area after which the released certain real storage area can be used for allocating to another logical area in the volume or in another volume as a destination of another request to write data.

17. A method according to the claim 16, further comprising:
receiving a file access request to the volume from the host system.

18. A method according to the claim 16, further comprising:
receiving a block access request to the volume from the host system.

19. A method according to the claim 16, further comprising:
allocating, after releasing the certain real storage area from allocation to the certain logical area, the first real storage area to the certain logical area for responding to a request to read data from the certain logical area.

20. A method according to the claim 16, wherein the first data is a specific data.

21. A method according to the claim 20, wherein the specific data is a data pattern of all zero data.

22. A method according to the claim 16, further comprising:
sending a certain data pattern in response to a request to read data from the certain logical area, which is in the volume and from which allocation of the certain real storage area in the storage pool is released.

\* \* \* \* \*

UNITED STATES PATENT AND TRADEMARK OFFICE
CERTIFICATE OF CORRECTION

| | | |
|---|---|---|
| PATENT NO. | : 8,180,989 B2 | |
| APPLICATION NO. | : 13/025451 | |
| DATED | : May 15, 2012 | |
| INVENTOR(S) | : T. Seki et al. | |

It is certified that error appears in the above-identified patent and that said Letters Patent is hereby corrected as shown below:

Please correct the title page as follows:

In the Notice section please add the following sentence:

--This patent is subject to a terminal disclaimer.--

Signed and Sealed this
Eleventh Day of September, 2012

David J. Kappos
*Director of the United States Patent and Trademark Office*